United States Patent
Glew

(10) Patent No.: US 8,912,243 B2
(45) Date of Patent: Dec. 16, 2014

(54) COMPOSITIONS, ADDITIVES, AND COMPOUNDS FOR MELT PROCESSABLE, FOAMABLE, AND CELLULAR FLUOROPLOYMERS

(75) Inventor: Charles A. Glew, Charlestown, RI (US)

(73) Assignee: Cable Components Group, LLC, Pawcatuck, CT (US)

( * ) Notice: Subject to any disclaimer, the term of this patent is extended or adjusted under 35 U.S.C. 154(b) by 195 days.

(21) Appl. No.: 12/590,471

(22) Filed: Nov. 9, 2009

(65) Prior Publication Data

US 2010/0072644 A1 Mar. 25, 2010

Related U.S. Application Data

(63) Continuation-in-part of application No. PCT/US2008/009286, filed on Aug. 1, 2008, and a continuation-in-part of application No. PCT/EP2008/060119, filed on Aug. 1, 2008, and a continuation-in-part of application No. PCT/US2008/009285, filed on Aug. 1, 2008.

(60) Provisional application No. 60/963,322, filed on Aug. 3, 2007, provisional application No. 60/953,729, filed on Aug. 3, 2007.

(51) Int. Cl.
| | |
|---|---|
| *C08J 9/00* | (2006.01) |
| *C08J 9/06* | (2006.01) |
| *C08K 3/34* | (2006.01) |
| *C08K 3/26* | (2006.01) |
| *C08J 9/08* | (2006.01) |
| *H01B 3/44* | (2006.01) |

(52) U.S. Cl.
CPC .............. *C08J 9/06* (2013.01); *C08J 2327/12* (2013.01); *C08J 9/08* (2013.01); *H01B 3/445* (2013.01); *C08J 9/0066* (2013.01)
USPC .............. 521/91; 521/130; 524/451; 524/544

(58) Field of Classification Search
USPC .................. 521/50, 91, 131; 524/451, 544
See application file for complete search history.

(56) References Cited

U.S. PATENT DOCUMENTS

| | | | |
|---|---|---|---|
| 3,624,250 A | 11/1971 | Carlson | |
| 4,029,868 A | 6/1977 | Carlson | |
| 4,331,619 A | 5/1982 | Chung et al. | |
| 4,394,460 A * | 7/1983 | Chung et al. | 521/92 |
| 4,513,129 A | 4/1985 | Nakagawa et al. | |
| 4,524,194 A | 6/1985 | Dumoulin | |
| 4,711,811 A | 12/1987 | Randa | |
| 4,739,024 A | 4/1988 | Moggi et al. | |
| 4,982,009 A | 1/1991 | Hung | |
| 5,229,432 A | 7/1993 | Muschiatti | |
| 5,310,838 A | 5/1994 | Hung et al. | |
| 5,571,462 A | 11/1996 | Hashimoto et al. | |
| 5,610,203 A | 3/1997 | Buckmaster et al. | |
| 5,677,404 A | 10/1997 | Blair | |
| 5,688,885 A | 11/1997 | Blair | |
| 5,703,185 A | 12/1997 | Blair | |
| 5,883,197 A | 3/1999 | Barbieri et al. | |
| 5,912,278 A | 6/1999 | Venkataraman | |
| 5,959,022 A | 9/1999 | Lin et al. | |
| 6,064,008 A | 5/2000 | Craton | |
| 6,139,957 A | 10/2000 | Craton | |
| 6,231,919 B1 | 5/2001 | Craton | |
| 6,232,357 B1 | 5/2001 | Barbieri et al. | |
| 6,395,795 B1 | 5/2002 | Hrivnak | |
| 6,506,809 B2 | 1/2003 | Hrivnak | |
| 6,512,013 B2 | 1/2003 | Hrivnak | |
| 6,573,303 B2 | 6/2003 | Liu et al. | |
| 6,812,314 B2 | 11/2004 | Lunardi et al. | |
| 6,946,495 B2 | 9/2005 | Zwynenburg et al. | |
| 7,172,719 B2 | 2/2007 | Jackson et al. | |
| 7,202,418 B2 | 4/2007 | Glew | |
| 7,241,826 B2 | 7/2007 | Shiotsuki et al. | |
| 7,439,297 B2 | 10/2008 | Abusleme et al. | |
| 7,465,879 B2 | 12/2008 | Glew | |
| 7,473,849 B2 | 1/2009 | Glew | |

(Continued)

FOREIGN PATENT DOCUMENTS

| | | | | |
|---|---|---|---|---|
| EP | 413255 B1 * | 3/1996 | ............. | H01B 13/14 |
| EP | 1520880 A | 4/2005 | | |
| EP | 2008-060119 | 12/2009 | | |
| EP | 2 176 326 B1 | 7/2011 | | |
| EP | 2176326 | 7/2011 | | |

(Continued)

OTHER PUBLICATIONS

Fisher, Michael M. "Plastics Recycling." Plastics and the Environment. John Wiley & Sons, Inc. 2003.*

(Continued)

*Primary Examiner* — Kara Boyle
(74) *Attorney, Agent, or Firm* — Thomas J. Engellenner; Reza Mollaaghababa; Pepper Hamilton LLP

(57) ABSTRACT

The disclosure provides a composition or set of compositions and method for producing cellular, foamed, or blown fluoropolymers such as perfluoropolymers and other thermoplastics to create a lower cost communications cable, conductor separator, conductor support-separator, jacketing, tape, wire insulation and in some cases a conduit tube as individual components or combined configurations that exhibit improved electrical, flammability and optical properties. Specifically, the foamable or blown perfluoropolymer cellular insulation composition comprises; talc and the selected fluoropolymers such as perfluoropolymers. Compounded pellets including inorganic and organic fillers resulting in products in cellular or foamable form with and without solid skin surfaces has also been realized by providing melt combinations within the pellets primarily comprising talc and a perfluoropolymer, and additives as needed to provide desired property differentiation.

66 Claims, 1 Drawing Sheet

(56) References Cited

U.S. PATENT DOCUMENTS

| | | | |
|---|---|---|---|
| 7,473,850 | B2 | 1/2009 | Glew |
| 7,968,613 | B2 | 6/2011 | Glew et al. |
| 2002/0061934 | A1 | 5/2002 | Hrivnak |
| 2004/0198886 | A1* | 10/2004 | Shiotsuki et al. ............. 524/404 |
| 2005/0107517 | A1 | 5/2005 | Abusleme et al. |
| 2005/0165165 | A1 | 7/2005 | Zwynenburg et al. |
| 2005/0199415 | A1 | 9/2005 | Glew |
| 2006/0237217 | A1 | 10/2006 | Glew |
| 2006/0237218 | A1 | 10/2006 | Glew |
| 2006/0237219 | A1 | 10/2006 | Glew |
| 2007/0052124 | A1 | 3/2007 | Park et al. |
| 2007/0102188 | A1 | 5/2007 | Glew |
| 2007/0203281 | A1 | 8/2007 | Alric et al. |
| 2007/0209825 | A1 | 9/2007 | Glew |
| 2008/0087454 | A1 | 4/2008 | Ohno et al. |
| 2008/0264670 | A1 | 10/2008 | Glew |
| 2008/0283271 | A1 | 11/2008 | Kenny et al. |
| 2009/0018225 | A1 | 1/2009 | Gemmel et al. |
| 2009/0048359 | A1 | 2/2009 | Glew |
| 2009/0069480 | A1 | 3/2009 | Zangara et al. |
| 2010/0072644 | A1 | 3/2010 | Glew |
| 2010/0151243 | A1 | 6/2010 | Glew |
| 2010/0206609 | A1 | 8/2010 | Glew |
| 2010/0243291 | A1 | 9/2010 | Glew |
| 2011/0224318 | A1 | 9/2011 | Glew et al. |

FOREIGN PATENT DOCUMENTS

| | | |
|---|---|---|
| EP | 2 380 923 A1 | 10/2011 |
| EP | 2380923 | 10/2011 |
| JP | 07-026050 A | 1/1995 |
| JP | 08-012796 A | 1/1996 |
| JP | 09-055120 A2 | 2/1997 |
| JP | 19-126631 A | 5/2007 |
| JP | 2007-126631 A | 5/2007 |
| KR | 10-0129862 B1 | 4/1998 |
| KR | 0129862 B1 | 4/1998 |
| KR | 10-2007-0004583 A | 1/2007 |
| KR | 2007004583 A | 1/2007 |
| WO | 97-15623 A1 | 5/1997 |
| WO | 03-000792 A | 1/2003 |
| WO | 2009/019209 A1 | 2/2009 |
| WO | 2009/020554 A2 | 2/2009 |
| WO | 2009/020555 A2 | 2/2009 |
| WO | 2009020554 A3 | 2/2009 |
| WO | 2009020555 A3 | 2/2009 |

OTHER PUBLICATIONS

Glew, Charles A., The Preliminary Amendment to the title "Compositions, additives, and compounds for melt processable, foamable, and cellular fluoroploymers"; U.S. Appl. No. 12/590,471, filed Nov. 9, 2009, Preliminary Amendment filed Jan. 22, 2010 with the EFS ID No. 6801435, all pages, not published.

Mineral Data Publishing, 2001, Talc.

AClyn Flyer, Honeywell, 2003.

Dupont. "DuPont™ Teflon® TE9811 Fluoropolymer Resin" Product Information Brochure, (Jul. 2007) RWJ36 Printed in U.S.A., DuPont Fluoroproducts,P.O. Box 80713,Wilmington, DE19880.

Dupont. "DuPont™ Teflon® FEP TE9810 Fluoropolymer Resin" Product Information Brochure, (Jul. 2007) RWJ36 Printed in U.S.A., DuPont Fluoroproducts,P.O. Box 80713,Wilmington, DE19880.

Horst Ulrich Reimer, "DuPont fluoropolymers for electrical insulation", (press release) Mar. 2008, FLP-Wire-2008-04, Düsseldorf, Germany.

International Search Report for International Application No. PCT/EP2008/060119 by Authorized Officer Udo Puffins, completed Dec. 16, 2008 and mailed Dec. 29, 2008.

PCT Written Opinion of the International Searching Authority (PCT Rule 43bis.1) on Application No. PCT/EP2008/060119 by Authorized Officer Udo Puttins.

PCT International Preliminaty Report on Patentability (Chapter I of the Patent Cooperation Treaty) (PCT Rule 44bis) on Application No. PCT/EP2008/060119 by Authorized Officer Yolaine Cussec, and dated Feb. 9, 2010.

Extended European Search Report issued Sep. 28, 2011 for Application No. 11169333.9 (5 pages).

Mexican Office Action issued Sep. 22, 2011 for Application No. MX/a/2009/008301 (2 pages).

Aclyn flyer, Honeywell, (2003).

PCT/EP2008/060119 International Search Report dated Dec. 29, 2008.

PCT/EP2008/060119 PCT International Preliminary Report on Patentability dated Feb. 9, 2010.

PCT/EP2008/060119 International Search Report dated Dec. 16, 2008.

PCT/EP2008/060119 Written Opinion.

Office Action for Canadian Application No. 2663275 dated Sep. 30, 2013.

* cited by examiner

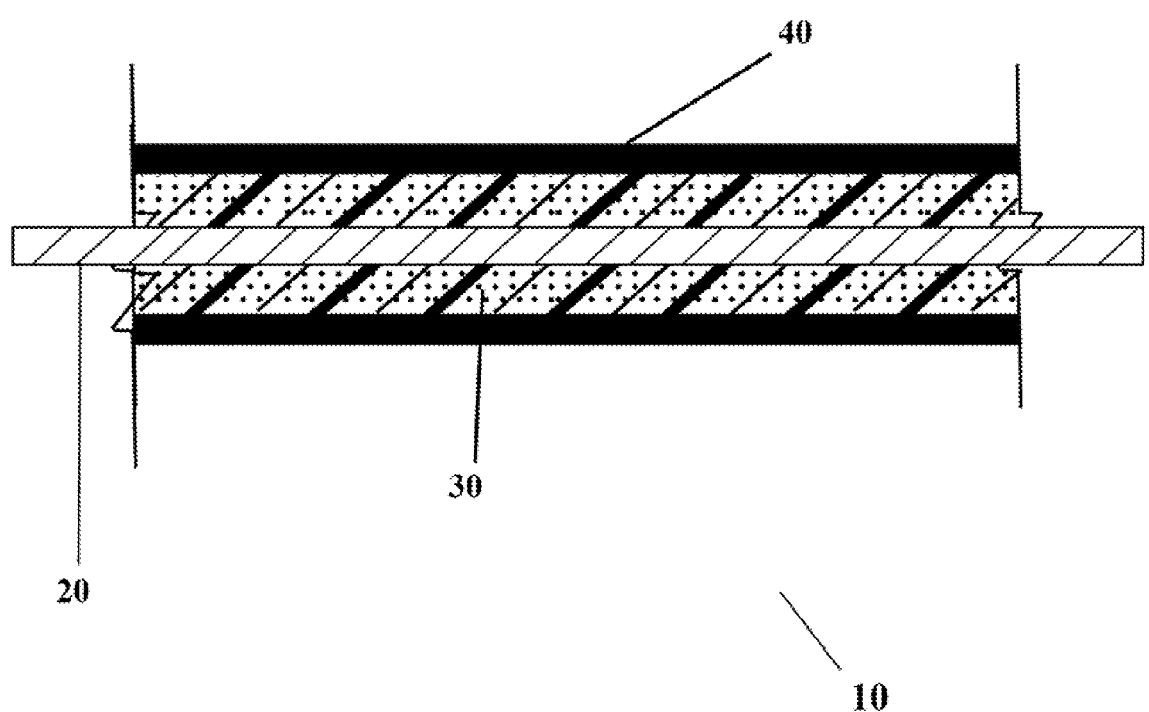

COMPOSITIONS, ADDITIVES, AND COMPOUNDS FOR MELT PROCESSABLE, FOAMABLE, AND CELLULAR FLUOROPLOYMERS

RELATED APPLICATIONS

This present application claims priority under 35 U.S.C. §120 as a continuation-in-part from PCT International Application No. PCT/US2008/009286, filed 1 Aug. 2008, titled: "Compositions for Compounding, Extrusion and Melt Processing of Foamable and Cellular Fluoropolymers", as well as PCT International Application No. PCT/EP2008/060119, filed 1 Aug. 2008, titled: "Perfluoropolymer Foamable Composition", and; PCT International Application No. PCT/US2008/009285, filed 1 Aug. 2008, titled: "Compositions for Compounding and Extrusion of Foamed Fluoropolymers". In addition this application claims priority from U.S. Non-Provisional application Ser. No. 12/221,280, filed 1 Aug. 2008 titled "Compositions for Compounding, Extrusion and Melt Processing of Foamable and Cellular Fluoropolymers". In addition, all applications listed also take original priority under 35 USC 119, from either U.S. Provisional Application No. 60/963,322, filed 3 Aug. 2007 or Provisional Application No. 60/953,729, also filed 3 Aug. 2007. All applications listed above and subsequent publications are herewith incorporated by reference.

FIELD OF INVENTION

Wire and cable applications, especially those using copper conductors, utilize the insulative properties of specific polymers over the conductors as insulation and over the entire cable core of insulated conductors as jackets. Cable fillers of varying shapes and size are used as well for their insulative properties and more specifically in communications designs to minimize pair-to-pair crosstalk within a cable as will as mitigating crosstalk between adjacent cables which is commonly referred to as "alien crosstalk." Jackets and cable fillers provide mechanical and physical properties as well as an ever evolving requirement for enhanced fire performance (i.e., reduced flame spread, ignitability, and smoke evolution). These mechanical, physical and fire retardancy performance requirements apply to fiber optic cables as well. Cable design demands a balance of these performance requirements and the attributes of extruding and processing a cellular foamed fluoropolymer, such as perfluoropolymer that improves both insulation values e.g. (lower crosstalk in communications cables) while lowering material content and therefore the amount of combustible materials used in a cable. These added performance characteristics through cellular (or microcellular) foaming can additionally lower cost of the overall cable design.

BACKGROUND OF INVENTION

Communication cables have evolved continuously over the years as we have evolved from a voice-based telecommunication network environment to the new structured cabling designs for high-speed data transmission which are commonly referred to as Local Area Networks or LAN's. Technical requirements, standards and guidelines of the Telecommunication Industry Association and Electronic Industry Association (TIA/EIA) and International Standard Organization (ISO) have been developed and published to support high-speed data communication of voice, internet and video. In addition, these requirements continue to evolve with more and more stringent electrical performance needs such that cellular foam insulation and fillers play an increasing role in the cable designs. The primary communications cable designs incorporate twisted copper pairs together to form a balanced transmission line, coaxial cables, and fiber optic cables. All of these cables may be run in a network of a building (LAN's) as separate functional cables or in hybrid or combination cable design.

Furthermore, TIA/EIA has defined standards that are published and recognized as well as industry drafts of soon-to-be published standards for commercial building telecommunication networks. Table 1, which follows, provides those published and pending, or soon-to-be adopted and published Technical Service Bulletin "TSB" standards.

TABLE 1

TIA/EIA Standards

| | | |
|---|---|---|
| Category 5e<br>ISO Class D | Frequency<br>Bandwidth<br>1 to 100 MHz | ANSI/TIA/EIA-568-A<br>Commercial Building<br>Telecommunications Standard Part 2:<br>Balanced Twisted Pair Cabling<br>Component; 2001 |
| Category 6<br>ISO Class E | Frequency<br>Bandwidth<br>1 to 250 MHz | ANSI/TIA/EIA-568-B.2-1<br>Commercial Building<br>Telecommunications Standard Part 2:<br>Addendum 1: Transmission<br>Specification for 4 pair 100 ohm<br>Category 6 Cabling; 2002 |
| Category 6A<br>ISO Class $E_A$ | Frequency<br>Bandwidth<br>1 to 500 MHz | ANSI/TIA/EIA-568-B.2-10<br>Commercial Building<br>Telecommunications Standard Part 2:<br>Addendum 10: Transmission<br>Specification for 4 Pair 100 ohm<br>Augmented Category 6 Cabling; |
| Category 7<br>ISO Class F | Frequency<br>Bandwidth<br>1 to 600 MHz | TIA not actively developing standard;<br>ISO/EIA-11801, $2^{nd}$ Ed.<br>Information Technology - Generic<br>Cabling for Customer Premises, 2002 |

Each of the standards of Table 1 illustrates continued widened bandwidth enabling greater data transmission. The broadening of communication cable bandwidth enhances the electrical characteristics or data bit rate based on the evolving needs of software, hardware and video transmission. The terminology within the standards for testing can be defined as electrical performance within the cable as measured by impedance, near end and far end crosstalk (NEXT & FEXT), attenuation to crosstalk ratio (ACR), ELFEXT, ELNEXT, Power Sum, etc., and the electrical performance that may be transferred to the adjacent cable a.k.a. (alien cross talk) which are measured within similar performance parameters while incorporating a power sum alien cross talk requirement.

Electromagnetic noise that can occur in a cable that runs alongside one or more cables carrying data signals can create alien crosstalk. The term "alien" arises from the fact that this form of crosstalk occurs between different cables in a group or bundle, rather than between individual wires or circuits within a single cable. Alien Crosstalk can be particularly troublesome because of its effect on adjacent 4 pair cables which degrades the performance of a communications system by reducing the signal-to-noise ratio. Traditionally, alien crosstalk has been minimized or eliminated by aluminum Mylar® shields and/or braid in shielded cable designs (i.e., Category 7 or ISO Class F shielded designs) to prevent electromagnetic fields from ingress or egress from the cable or cables. The use of foamed or blown constructions for symmetrical and asymmetrical airspace designs further improve electrical performance characteristics in that the overall modulus and elasticity of the resulting foamed compounds are reduced leading to final conformations that more closely approach optimal geometries. Specifically, the ability to form inner structures of cables such that these inner structures have little or no plastic memory once the cabling process is completed, ensures that the nested pairs remain in the desired geometric configuration and that the use of foamed fillers, insulations and jackets using air as an insulator act to mitigate alien crosstalk in Unshielded Twisted Pair (UTP) designs (i.e., Category 6 or ISO Class E and Category 6 Augmented or ISO Class $E_A$).

These Electrical Performance Standards especially for UTP cables (Category 5e, 6, 6A and 7) necessitate improved insulative performance wherein foamed fluoropolymers optimize their inherently excellent insulative values (i.e., dielectric constant and dissipation factor). Foamed fluoropolymers, such as, perfluoropolymers offer lower cost and lower material content while improving fire retardancy performance by lowering the amount of combustible material in a cable and the overall fire load of Local Area Network cables within a building.

A brief review of the Fire Performance Requirements both in North America and Globally follows:

In 1975, the National Fire Protection Agency (NFPA) recognized the potential flame and smoke hazards created by burning cables in plenum areas, and adopted within the United States, the National Electric Code (NEC), and a standard for flame retardant and smoke suppressant cables. This standard, commonly referred to as "the Plenum Cable Standard", was later adopted for North America Communications Cabling by Canada and Mexico. The standard permits the use of power-limited type cables that includes communication cables without conduit, so long as the cable exhibits low smoke and flame retardant characteristics. The test method for measuring these characteristics is commonly referred to as the Steiner Tunnel Test. The Steiner Tunnel Test has been adapted for the burning of cables according to the following test protocols: NFPA 262, Underwriters Laboratories (U.L.) 910, or Canadian Standards Association (CSA) FT-6. The test conditions for each of the U.L. 910 Steiner Tunnel Test, CSA FT-6, and NFPA 262 are as follows: a 300,000 BTU/hour flame is applied for 20 minutes to a calculated number of cable lengths based on their diameter that fills a horizontal tray approximately 25 feet long with an enclosed tunnel. This test simulates the horizontal areas (ceilings) in buildings wherein these cables are run.

The criteria for passing the Steiner Tunnel Test UL 910/NFPA 262 are as follows:
  A. Flame spread—a maximum flame spread of less that 5 feet.
  B. Smoke generation:
    1. A maximum optical density of smoke less than 0.5.
    2. An average optical density of smoke less than 0.15.

The premise of the standard is based on the concerns that flame and smoke could travel along the extent of a building plenum area if the electrical conductors and cable were involved and were not flame and smoke resistant. The National Fire Protection Association ("NFPA") developed the standard to reduce the amount of flammable material incorporated into insulated electrical conductors and jacketed cables. Reducing the amount of flammable material would, according to the NFPA, diminish the potential of the insulating and jacket materials from spreading flames and evolving smoke to adjacent plenum areas and potentially to more distant and widespread areas within a building. The cellular foamable fluoropolymer products of this disclosure can typically reduce the quantity of combustible materials by 30 to 60 percent based on the extent of the foaming process within insulations, fillers and jacket materials.

The products of the present disclosure have also been developed to support the possible adoption of a new NFPA standard referenced as NFPA 255 entitled "Limited Combustible Cables" with less than 50 as a maximum smoke index and NFPA 259 entitled "Heat of Combustion" which includes the use of an oxygen bomb calorimeter that allows for materials with less than 3500 BTU/lb. for incorporation into cabling systems and buildings wherein survivability of the communication network from fires is required (i.e., military installation such as the Pentagon in Washington D.C.).

For these applications requiring survivability from flame spread and smoke generation, the cellular products of the present disclosure can be an effective method in reducing material content and the fuel load of cables in such critical environments.

Table 2 provides a hierarchy of fire performance standards for North America and Europe.

TABLE 2

Flammability Test Methods and Level of Severity for Wire and Cable

| Cable Type | Test Method | Ignition Source Output | Duration |
| --- | --- | --- | --- |
| Limited Combustible | UL2424/NFPA 259/255/UL723 | 8,141 KJ/kg (3,500 BTU/lb.) | 10 min. |
| CMP | Steiner Tunnel UL 910/NFPA 262 | 88 kW (300 k BTU/hr.) | 20 min. |
| CMR | RISER UL 1666/UL2424/NFPA 259 | 154 kW (527 k BTU/hr.) | 30 min. |
| CPD Class D | Single Burning Item | 30 kW (102 k BTU/hr.) | 30 min. (20 min burner) |
| CPD Class D | Modified IEC 60332-3 | 30 kW (102 k BTU/hr.) (Backboard behind ladder (heat impact)) | 20 min. |
| CM | IEC 60332-3 | 20.5 kW (70 k BTU/hr.) | 20 min. |
| CMX | Vertical Tray | 20.5 kW (70 k BTU/hr.) | 20 min. |
| CMUC | IEC 60332-1/ULVW-1 | Bunsen Burner | 1 min. (15 sec. Flame) |

Cable Fire Performance (Levels of Severity)
NFPA 255 & NFPA 259/LC/CPD Class B1+/UL 2424    (most stringent)
NFPA 262/EN 50289/FT-6/CPD Class B1/UL 910       |
UL 1666 Riser/FT-4/CPD Class C & B2              |
UL 1581 Tray/IEC 60332-3/FT-2/CPD Class D        |
VW 1/IEC 60332-1/FT-1/CPD Class E                (least stringent)

SUMMARY OF THE INVENTION

In the present disclosure the term blowing agent(s), foaming agent(s), may be used interchangeably. The term chemical blowing agent as used herein refers to a type of foaming agent that can undergo a chemical reaction, e.g., chemical degradation and/or decomposition, to generate gas, which can cause foaming. The term nucleating agent(s) are used in materials that provide sites for the formation of cells resulting, e.g., from the chemical reaction of the blowing agents or the use of gas injection.

The present disclosure provides for the use of talc or talc derivatives which are natural or synthetic hydrated magnesium silicate compound(s). Talc (derived from the Persian talc via Arabic talq) is a mineral composed of hydrated magnesium silicate with the chemical formula $H_2Mg_3(SiO_3)_4$ or $Mg_3Si_4O_{10}(OH)_2$. In loose form, it is the widely used substance known as talcum powder. It occurs as foliated to fibrous masses, its monoclinic crystals being so rare as to be almost unknown. It has a perfect basal cleavage, and the folia are non-elastic, although slightly flexible. It is sectile and very soft, with a hardness of 1, and can be easily scratched by a fingernail. It has a specific gravity of 2.5-2.8, a clear or dusty luster, and is translucent to opaque. Talc is not soluble in water, but it is slightly soluble in dilute mineral acids. Its colour ranges from white to grey or green and it has a distinctly greasy feel. Its streak is white.

Soapstone is a metamorphic rock composed predominantly of talc and can also be used in the present disclosure.

Talc is a metamorphic mineral resulting from the metamorphism of magnesian minerals such as serpentine, pyroxene, amphibole, olivine, in the presence of carbon dioxide and water. This is known as talc carbonation or steatization and produces a suite of rocks known as talc carbonates.

Talc is primarily formed via hydration and carbonation of serpentine, via the following reaction;

serpentine+carbon dioxide→talc+magnesite+water

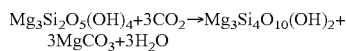
$Mg_3Si_2O_5(OH)_4 + 3CO_2 \rightarrow Mg_3Si_4O_{10}(OH)_2 + 3MgCO_3 + 3H_2O$ Talc can also be formed via a reaction between dolomite and silica, which is typical of skarnification of dolomites via silica-flooding in contact metamorphic aureoles;

dolomite+silica+water→talc+calcite+carbon dioxide

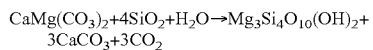
$CaMg(CO_3)_2 + 4SiO_2 + H_2O \rightarrow Mg_3Si_4O_{10}(OH)_2 + 3CaCO_3 + 3CO_2$ Talc can also be formed from magnesian chlorite and quartz in blueschist and eclogite metamorphism via the following metamorphic reaction:

chlorite+quartz→kyanite+talc+water

In this reaction, the ratio of talc and kyanite is dependent on aluminium content with more aluminous rocks favoring production of kyanite. This is typically associated with high-pressure, low-temperature minerals such as phengite, garnet, glaucophane within the lower blueschist facies. Such rocks are typically white, friable, and fibrous, and are known as whiteschist.

Talc is a tri-octahedral layered mineral; its structure is similar to that of pyrophyllite, but with magnesium in the octahedral sites of the composite layers.

The present disclosure refers to talc as natural or synthetic hydrated magnesium silicate. It has been discovered that talc acts independently as a chemical blowing agent in combination with the fluoropolymers, such as, perfluoropolymers of the present invention without the need for additional blowing agents, foaming agents or in some cases in combination with a small amount of another blowing agent. In certain cases, the talc is compounded into solid fluoropolymer pellets or fluorinated polymeric foamable pellets (in the form of one or more pellets) from which foamed products may be obtained by extrusion or injection molding, wherein the pellets containing talc act as a chemical blowing agent and in some cases as a nucleating agent when the pellets are heated and extruded.

The embodiments within this disclosure reference talc as a chemical blowing agent as well as a nucleating agent except where otherwise noted. The use of talc in combination with the use of another chemical blowing agent or gas injection is also included in the scope the present disclosure.

This disclosure provides a compositions, methods and systems for compounding foamable pellets from fluorinated polymers (e.g. fluoropolymers such as perfluoropolymers) and furthermore these foamable pellets may be extruded to create a variety of foamed articles, such as lower cost communications cable, conductor separator, conductor/cable support-separator, jacketing, tapes, tubes, crosswebs, wraps, wire insulations and as well as conduit tubes for individual components or any said communications cables, conductor separators, cable support-separators, wire insulation and several combined configurations that exhibit improved electrical, flammability and optical properties.

The foamable fluoropolymers such as perfluoropolymers disclosed advantageously allow reducing the amount of combustible materials within a cable as well as enhancing electrical properties while reducing costs. The blown, foamed or cellular fluoropolymer such as perfluoropolymers insulation, jacket, or filler material can be formed using a nucleating/foaming agent of talc the chemical composition of which includes $MgSiOH$; $H_2Mg_3(SiO_3)_4$; $Mg_3Si_4O_{10}(OH)_2$; $3MgO+4SiO_2+H_2O$; $MgOH+H_2O+SiOH$; or any derivatives thereof, that synergistically reacts with the fluoropolymers (such as perfluoropolymers) at their elevated or higher extrusion operating temperatures with or without a chemical blowing agent, such as magnesium carbonate, calcium carbonate, and/or a mixture of both magnesium carbonate and calcium carbonate, or gas blowing agent. The nucleating/foaming agent of talc creates a foam ideally suited for the requirement of Category 6 and 6A UTP insulation, jacket, or fillers (i.e., crosswebs, circular profiles, tubes and tapes) and is highly cost effective at approximately $1.00 per lb. as a replacement for the traditionally used Boron Nitride (nucleating agent) that costs approximately $60.00 per lb. The talc (a chemical blowing agent and it may also act as a nucleating agent), cost significantly less than $1.00 per lb when purchased in larger quantities.

The reduction in cost from changing Boron Nitride to talc is one of many benefits of using talc as both a nucleating agent and a foaming agent. Another benefit of using talc is that insulation, jacketing and filler extrusion may be performed by a relatively simple and robust chemical reaction that uses varying extrusion temperatures to foam at various rates or percentages which are desired based on varying talc loadings. Noteworthy, under specific extrusion conditions that are described in further detail below, talc itself "foams". Traditional foaming of fluoropolymers, such as, perfluoropolymers has been achieved via a gas injection extrusion process and the use of nucleated, fluoropolymers such as, perfluoropolymers with Boron Nitride. The cost benefits of chemical foaming vis-à-vis gas foaming of fluoropolymers such as perfluoropolymers enable standard high temperature extruders to run foam fluoropolymers or perfluoropolymers without the need to port the barrel with a highly sophisticated gas valve, as well as the design and use of a specialized compression screw. The use of talc as a nucleating agent also works effectively with traditional gas injection extrusion processes as a partial or complete replacement for Boron Nitride.

An added benefit of using talc which is either alkali or base is that it neutralizes the acidity of hydrogen fluoride (HF) which may evolve during extrusion. HF is highly acidic and causes corrosion in extrusion barrels, screws and extrusion head, tools and dies. Traditional metals or non-Hasteloy or Inconel surfaces cannot be used to extrude fluoropolymers or perfluoropolymers under normal process conditions and the use of talc significantly reduces the acidity of the HF, thus mitigating corrosive wear on standard extrusion equipment.

The introduction of talc has the benefit of being an acid (HF) scavenger when compounded into pellets prior to extrusion and acts as both a nucleating as well as a foaming agent. Furthermore, when enhanced with the addition of a pelletized fluoropolymer, such as, perfluoropolymer with $MgCO_3$ and $CaCO_3$ and Aclyn® wax (a registered trademarked wax provided by Honeywell, U.S.A. headquartered in Morristown, N.J.) fluoropolymers such as, perfluoropolymer foaming levels are further enhanced. In some cases, this foaming agent of magnesium carbonate and/or calcium carbonate may be added as a separate pellet in a tumble blended mix or compounded together in a single homogenous pellet of talc (Mg-SiOH) and $MgCO_3/CaCO_3$/AClyn wax. The single homogenous pellet can then be extruded to form a variety of articles, such as communication cables, conductor separators, cable support-separators, wire insulation, jacketing, wraps, tapes, conduit tubes or any combination of said communications cables, conductor separators, cable support-separators, wire insulation, or fillers, for example, in a simple chemically foamed extrusion process for fluoropolymers or perfluoropolymers. The foaming rate from 15 percent to 50 percent can be raised or lowered based on the percentage of each constituent used as well as by adjustments in extrusion temperatures, and screw design.

The present disclosure provides for the use of fluoropolymers such as perfluoropolymers in any amount and in any combination. The family of fluoropolymers such as perfluoropolymers with which these compounded nucleating and foaming agents may be used is at least the following:

The fluoropolymers that are characterized here are the melt processable materials for which this disclosure is focused:
1. MFA (Polytetrafluoroethylene-Perfluoromethylvinylether)
2. FEP (Fluorinated Ethylene Propylene)
3. PFA (Perfluoroalkoxy)
4. PTFE (Polytetrafluoroethylene)
5. ETFE (Ethylene tetrafluoroethylene or (poly(ethylene-co-tetrafluoroethylene))
6. ECTFE (Ethylene chlorotrifluoroethylene)
7. PVDF (Polyvinylidene Fluoride)

The perfluoropolymers that are characterized here are the melt processable materials for which this disclosure is focused:
1. MFA (Polytetrafluoroethylene-Perfluoromethylvinylether)
2. FEP (Fluorinated Ethylene Propylene)
3. PFA (Perfluoroalkoxy)
4. PTFE (Polytetrafluoroethylene)

It should be emphasized that the use of talc may be independent of the use of $MgCO_3/CaCO_3$/Aclyn wax or talc may be used in any combination with $MgCO_3/CaCO_3$/Aclyn wax to produce the desired foamed compositions.

A variety of perfluoropolymers can be used. The perfluoropolymers described are fluoropolymer resins that can be used and include, without limitation, copolymers of TFE with one or more copolymerizable monomers chosen from perfluoroolefins having 3-8 carbon atoms and perfluoro (alkyl vinyl ethers) (PAVE) in which the linear or branched alkyl group contains 1-5 carbon atoms. Preferred perfluoropolymers include copolymers of TFE with at least one hexafluoropropylene (HFP) unit and one PAVE (unit). Preferred comonomers include PAVE in which the alkyl group contains 1-3 carbon atoms, especially 2-3 carbon atoms, i.e. perfluoro (ethyl vinyl ether) (PEVE) and perfluoro (propyl vinyl ether) (PPVE). Additional fluoropolymers that can be used include copolymers of ethylene with TFE, optionally including minor amounts of one or more modifying comonomer such as perfluorobutyl ethylene. Representative fluoropolymers are described, for example, in ASTM Standard Specifications D-2116, D-3159, and D-3307. Such fluoropolymers are non-functional fluoropolymers if they have essentially no functional groups, but are functionalized fluoropolymers if functional groups are added, e.g., by grafting. Alternatively or additionally, preferred fluoropolymers are non-elastomeric, as opposed to elastomeric.

Functionalized fluoropolymers include fluoropolymers such as those described in the foregoing paragraph and additionally containing copolymerized units derived from functional monomers. If the concentration of functional monomer is in a large enough concentration in the TFE copolymer, however, no other comonomer may be needed. Usually, but not necessarily, the functional groups introduced by such monomers are at the ends of pendant side groups. Functional monomers that introduce pendant side groups having such functionality can have the general formula CYZ wherein Y is H or F and Z contains a functional group. Preferably, each Y is F and —Z is —Rf—X, wherein Rf is a fluorinated diradical and X is a functional group that may contain $CH_2$ groups. Preferably, Rf is a linear or branched perfluoroalkoxy having 2-20 carbon atoms, so that the functional comonomer is fluorinated vinyl ether. Examples of such fluorovinylethers include $CF_2CF[OCF_2CF(CF_3)]m-O-(CF_2)n\ CH_2OH$ as disclosed in U.S. Pat. No. 4,982,009 and the alcoholic ester $CF_2-CF[OCF_2CF(CF_3)]m-O-(CF_2)n-(CH_2)p-O-COR$ as disclosed in U.S. Pat. No. 5,310,838. Additional fluorovinylethers include $CF_2CF[OCF_2CF(CF_3)]m\ O(CF_2)n\ COOH$ and its carboxylic ester $CF_2CF[OCF_2CF(CF_3)]m\ O(CF_2)n\ COOR$ disclosed in U.S. Pat. No. 4,138,426. In these formulae, m=0-3, n=1-4, p=1-2 and R is methyl or ethyl. Preferred fluorovinylethers include $CF_2CF-O-CF_2CF_2-SO_2F$; $CF_2CF[OCF_2CF(CF_3)]O(CF_2)_2-Y$ wherein —Y is $-SO_2F$, —CN, or —COOH; and $CF_2.CF[OCF_2CF(CF_3)]O(CF_2)_2-CH_2-Z$ wherein —Z is —OH, —OCN, —O—(CO)—$NH_2$, or —OP(O)(OH)$_2$. These fluorovinylethers are preferred because of their ability to incorporate into the polymer backbone and their ability to incorporate functionality into the resultant copolymer.

In a preferred embodiment, a foamable composition is disclosed that comprises at least one fluoropolymer, at least one magnesium silicate compound, and a foaming agent; where the foaming agent is present in a concentration range of about 0.1 percent to about 10 percent by weight of the foamable composition. By way of example, in some cases, the foaming agent can be magnesium carbonate, calcium carbonate or a mixture of both magnesium carbonate and calcium carbonate.

In some cases, in the above embodiment, the foaming agent is present in a concentration range of about 0.1 percent to about 5 percent by weight of the foamable composition. In other cases, the foaming agent is present in a concentration range of about 0.1 percent to about 0.2 percent by weight of the foamable composition.

In some embodiments, at least one magnesium silicate compound includes talc or any talc derivative.

In some embodiments, at least one magnesium silicate compound comprises at least one hydrated magnesium silicate compound.

In some embodiments, the at least one magnesium silicate compound is present in a concentration range of up to about 50 percent by weight of the foamable composition. For example, the at least one magnesium silicate compound can be present in a concentration range of about 2 percent to about 50 percent by weight of the foamable composition.

In some embodiments, the at least one magnesium silicate compound is present in a concentration range up to about 20 percent by weight of the foamable composition. For example, at least one magnesium silicate compound can be present in a concentration range of about 0.2 percent to about 20 percent by weight of the foamable composition. In some cases, at least one magnesium silicate compound can be present in a concentration range of about 0.5 percent to about 20 percent by weight of the foamable composition, e.g., in a concentration range of about 2 percent to about 20 percent by weight of the foamable composition. Further, in some embodiments at least one magnesium silicate compound is present in a concentration range of about 15 percent to about 20 percent by weight of the foamable composition.

In some embodiments, at least one magnesium silicate compound is present in a concentration greater than about 30 percent by weight of the foamable composition. For example, at least one magnesium silicate compound can be present in a concentration range of about 30 percent to about 50 percent by weight of the foamable composition.

In a particular embodiment, at least one magnesium silicate compound comprises about 7.5 percent by weight of the foamable composition. In some embodiments, the foaming agent comprises a mixture of magnesium carbonate and calcium carbonate.

In a particular embodiment, at least one magnesium silicate compound comprises about 6 percent by weight of the foamable composition and the foaming agent comprising of magnesium carbonate and calcium carbonate combined comprises about 0.4 percent by weight of the foamable composition.

In one embodiment, the foamable composition includes talc at about 7 percent by weight combined with less than about 93 percent neat resin (fluoropolymer, such as, perfluoropolymer).

In another embodiment, foaming in a composition will occur with the use of talc at 10 percent by weight with less than 90 percent by weight of the neat resin and additional components as needed to complete the foaming agent.

In some embodiments, magnesium carbonate comprises about 0.3 percent to about 3 percent by weight of the foamable composition and calcium carbonate comprises about 0.1 to about 1 percent by weight of the foamable composition.

In some embodiments, at least one magnesium silicate compound comprises about 6 percent by weight of the foamable composition and magnesium carbonate comprises about 1 percent by weight of the foamable composition.

In some embodiments, the foaming agent comprises of calcium carbonate and at least one magnesium silicate compound and the calcium carbonate is present at a sufficient weight percent of the foamable composition such that the foamable composition is capable of being processed so as to form a foamed article. A variety of fluoropolymers can be employed in the above foamable composition. In some cases, the fluoropolymer can be a perfluoropolymer. By way of example, the fluoropolymer can be any of MFA, FEP, PFA, PTFE, ETFE, ECTFE, PVDF, and/or combination of any two or more of these fluoropolymers. In some cases in which the fluoropolymer is a perfluoropolymer, the perfluoropolymer can be, without limitation, any of MFA, FEP, PFA, PTFE, and/or combinations of two or more of these perfluoropolymers.

In some embodiments, the foamable composition is in the form of one or more pellets and the pellets are capable of being processed to form a foamed article. In some cases, the foamed article can be capable of meeting specific flammability and smoke generation requirements as defined by UL 910, UL 2424, NFPA 262, 259, 255 and EN 50266-2-x, and/or class B test specifications.

In some cases, the foamed article can comprise foamed cells having diameters in a range of about 0.0005 inches to about 0.003 inches. In some cases, the foamed cells can have an average diameter of about 0.0008 inches. The foamed cells can have a closed or open cell structures.

The foamable compositions of the invention can be used to form a variety of foamed articles. Some examples include, without limitation, communications cables, conductor separators, cable support-separators, wire insulation, jacketing, wraps, tapes, conduit tubes, or any combination of such articles.

In some embodiments, the foamable composition is combined with an additional of at least one fluoropolymer and the combination is capable of being processed to form a foamed article.

In some embodiments, the at least one magnesium silicate compound is capable of functioning as both a nucleating agent and a foaming agent of the foamable composition having at least one fluoropolymer, where the magnesium silicate compound allows for processing at a temperature of up to 30 degrees F. below conventional temperatures normally required during extrusion of conventional foamable compositions having the at least one fluoropolymer.

In some preferred embodiments, the foamable composition comprises at least one fluoropolymer, talc and/or any talc derivative, and an additional foaming agent where the additional foaming agent is present in a concentration range of about 0.1 percent to about 10 percent by weight of the foamable composition. In some cases, the additional foaming agent is present in a concentration range of about 0.1 percent to about 5 percent, or in a range of about 0.1 percent to about 2 percent, by weight of the foamable composition.

In some embodiments, the additional foaming agent can be, for example, magnesium carbonate, calcium carbonate, or a mixture of both magnesium carbonate and calcium carbonate. Further, the talc or any talc derivative can be present in a concentration range of up to about 50 percent by weight of the foamable composition. By way of example, the talc or any talc derivative can be present in a concentration range of about 2 percent to about 50 percent. In some cases, the talc or any talc derivative can be present in a concentration range up to about 20 percent by weight of the foamable composition. By way of example, the talc or any talc derivative can be present in a concentration range of about 0.2 to about 20 percent, or in a concentration range of about 0.5 to about 20 percent, or in a concentration range of about 2.0 to about 20 percent, or in a concentration range of about 15 percent to about 20 percent by weight of the foamable composition. In some cases, the talc or any talc derivative can be present in a concentration range equal or greater than about 30 percent, e.g., in a range of about 30 percent to about 50 percent, by weight of the foamable composition.

In one embodiment, the talc or the talc derivative is present at a concentration of about 7.5 percent by weight of the foamable composition. In another embodiment, the talc or any talc derivative is present at a concentration of about 6 percent by weight of the foamable composition and the additional foaming agent comprises about 0.4 percent by weight of the foamable composition.

In some embodiments, the additional foaming agent is present in a concentration range of about 0.1 percent to about 5 percent by weight of the foamable composition, e.g., in a range of about 0.1 percent to about 2 percent by weight of the foamable composition.

In some embodiments, the additional foaming agent can be magnesium carbonate, calcium carbonate or a mixture of magnesium carbonate and calcium carbonate. By way of example, the magnesium carbonate in the mixture can comprise about 0.3 percent to about 3 percent by weight of the foamable composition and the calcium carbonate can comprise about 0.1 percent to about 1 percent by weight of the foamable composition.

In one embodiment, the talc or any talc derivative comprises about 6 percent by weight of the foamable composition and the foaming agent comprises magnesium carbonate at about 1 percent by weight of the foamable composition.

In another aspect, a foaming composition is disclosed which comprises at least one fluoropolymer in a molten state at an elevated temperature, at least one magnesium silicate compound dispersed in the molten fluoropolymer, and a foaming agent dispersed in the molten fluoropolymer; where the elevated temperature is sufficient to activate the foaming agent and where the foaming agent is present in a concentration range of about 0.1 percent to about 10 percent by weight of the foaming composition.

In some embodiments, the elevated temperature can be greater than about 340 degrees F. and for lower melting fluoropolymers the elevated temperature is often in a range of about 430 degrees F. to about 530 degrees F., e.g., in a range of about 490 degrees F. to about 530 F.

In some embodiments, the elevated temperature to activate the foaming agent is greater than about 525 degrees F. In other embodiments, the elevated temperature can be in one of the following ranges: in a range of about 570 degrees F. to about 600 degrees F.; in a range of about 600 degrees F. to about 660 degrees F.; in a range of about 630 degrees F. to about 660 degrees F.; in a range of about 640 degrees F. to about 660 degrees F.

In some cases, the fluoropolymer in the foaming composition comprises two or more different fluoropolymers.

In some embodiments, the magnesium silicate compound in the foaming composition is capable of functioning as both a nucleating agent and a foaming agent and can allow for processing the foaming composition at a temperature that is up to about 30 degrees F. below conventional temperatures normally required during extrusion of conventional foamable composition having the same fluoropolymer. Such conventional temperatures can be slightly lower or above the melting point of the fluoropolymer, and the magnesium silicate compound can act as a processing aid to reduce or eliminate melt fracture during processing of the fluoropolymer.

In some embodiments, the magnesium silicate compound in the foaming composition can be a hydrated magnesium silicate compound. For example, the magnesium silicate compound can be talc or any talc derivative. Further, the foaming agent can be magnesium carbonate, calcium carbonate or a mixture of both magnesium carbonate and calcium carbonate.

In some embodiments of the foaming composition, at least one magnesium silicate compound is present in a concentration range of up to about 50 percent by weight of the foaming composition. For example, at least one magnesium silicate compound can be present in a concentration range of about 2 percent to about 5 percent by weight of the foaming composition.

In some embodiments, the magnesium silicate compound can be present in a concentration range up to about 20 percent by weight of the foaming composition, e.g., in a concentration range of about 0.2 percent to about 20 percent, or in a concentration range of about 0.5 percent to about 20 percent, or in a concentration range of about 2 percent to about 20 percent, or in a concentration range of about 15 percent to about 20 percent of the foaming composition.

Further, in some embodiments, at least one magnesium silicate compound is present in a concentration equal or greater than about 30 percent by weight of the foaming composition, e.g., in a range of about 30 percent to about 50 percent by weight of the foaming composition.

In one embodiment, at least one magnesium silicate comprises about 7.5 percent by weight of the foaming composition.

In another embodiment, at least one magnesium silicate compound comprises about 6 percent by weight of the foaming composition and the foaming agent comprises about 0.4 percent by weight of the foaming composition.

In some embodiments, the foaming agent comprises of a mixture of magnesium carbonate and calcium carbonate. In some cases, the magnesium carbonate comprises about 0.3 percent to about 3.0 percent by weight of the foaming composition and the calcium carbonate comprises about 0.1 percent to about 1 percent by weight of the foaming composition.

In one embodiment, at least one magnesium carbonate comprises about 6 percent by weight of the foaming composition and the foaming agent comprises only magnesium carbonate at a concentration of about 1.0 percent by weight of the foaming composition.

In many embodiments, at least one magnesium silicate compound and the foaming agent, e.g., calcium carbonate, are present at sufficient concentrations such that the foaming composition is capable of being processed to form a foamed article.

In yet another embodiment, the foamable and/or foaming composition includes a chemical agent that is capable of functioning as both a nucleating agent such that the chemical agent allows for processing at a temperature of up to 30 degrees F. below the conventional temperatures normally required during extrusion of the foaming composition.

Another added benefit of using talc is that it neutralizes the acidity of hydrogen fluoride (HF) which may evolve during extrusion. HF is highly acidic and causes corrosion in extrusion barrels, screws and extrusion head, tools and dies. Traditional metals or non-Hasteloy or Inconel surfaces cannot be used to extrude perfluoropolymers under normal process conditions and the use of talc significantly reduces the acidity of the HF, thus mitigating corrosive wear on standard extrusion equipment.

In one embodiment, the conventional temperatures are near or above the melting point of at least one fluoropolymer and where the chemical agent functions as both a nucleating agent and blowing agent and acts as a processing aid to reduce or eliminate melt fracture during processing of at least one fluoropolymer. Pellets of the compounds described above can be created at about 430-660 degrees F. and under certain conditions as low as about 340 degrees F. within the extruder barrel.

One embodiment of the present application includes, a first composition comprising a foaming agent comprising one or more fluoropolymers such as one or more perfluoropolymers, plus talc or other talc derivative (which may include $H_2Mg_3(SiO_3)_4$; $Mg_3Si_4O_{10}(OH)_2$; $3MgO+4SiO_2+H_2O$; $MgOH+H_2O+SiOH$) which is blended, melted and extruded into a solid pelletized form for extrusion that allows for blowing or foaming with or without gas injection and with or without another chemical foaming agent.

A specific embodiment includes mixtures of a foaming agent comprising perfluoropolymer pellets (e.g., about 85 percent by weight of the composition) and talc (e.g., 15 percent by weight of the composition) which is compounded together via heating to a selected melting point and extruded into a pelletized form, tumble blended in pelletized form for subsequent extrusion such that the pellets are placed in an extruder, heated to a selected melting point allowing for manufacture of blown or foamed insulative components.

An additional composition may comprise using exclusively a foaming agent with nucleating capabilities in a tumbled blend of 30 percent foaming agent with 70 percent perfluoropolymer pellets.

An additional embodiment includes a composition comprising a single perfluoropolymer or a mixture of different perfluoropolymers or recycled perfluoropolymers wherein the recycled perfluoropolymers comprise from 1.0-100 percent of the perfluoropolymers.

In another embodiment of a composition, an additional nucleating agent may be used in combination with the talc in an amount from about 1 percent to 10 percent by weight of the composition.

In another embodiment, a composition comprises talc in an amount from about 2 percent to about 20 percent by weight.

Another embodiment, includes the talc of a composition, during blowing or foaming, reacting synergistically with another composition to form smaller, more uniform cell structures in the foamed or blown other composition.

Additionally, in an embodiment, a composition comprises 100 percent non-recycled talc powder combined with 100 percent non-recycled perfluoropolymer wherein the ratio of talc to perfluoropolymer is about 0.5 percent to 20 percent by weight of the composition.

In another embodiment the talc and/or the fluoropolymers and perfluoropolymer may be recycled or virgin.

In another embodiment a composition comprises talc in an amount from about 0.5 percent to about 20 percent by weight wherein the talc and/or fluoropolymers, such as, perfluoropolymer may be recycled materials.

In another embodiment a composition comprises inorganic or organic salt(s) and fluoropolymers, such as, perfluoropolymers.

In another embodiment the cellular insulation is 100 percent recyclable.

In another embodiment, a composition can comprise either inorganic or organic additives or both such as inorganic salts, metallic oxides, silica and silicon oxides as well as substituted and unsubstituted fullerenes.

Also in an embodiment a composition is capable of meeting specific flammability and smoke generation requirements as defined by UL 910, UL 2424, NFPA 262, 259, 255, and EN 50266-2-x, class B test specifications.

In some cases, a twin-screw extruder can be used for melting, blending and pelletizing the compositions. In more detail, in some cases the compounding process utilizes a two-step system to insure the foaming components are thoroughly distributed and dispersed in the base polymer of the final compound. The first step requires a masterbatch blend be made of the foaming agents. The foaming agents are in a fine powder form and a high intensity blender, (e.g. Henschel type) is used to prepare the powder blend according to the specified formulation. A certain amount of resin, also in powder form, can be used in the first blending step as a mechanism to predisperse the foaming agents and aid in the second extrusion compounding step. The second stage of the compound preparation process utilizes a twin screw extrusion compounding system to incorporate the foaming agent masterbatch blend with the base resin. The design of the compounding screw is such that there is sufficient heat and mechanical energy to fully thermally melt the base polymer and incorporate the masterbatch blend with proper distribution and dispersion during mixing for homogeneity, but yet mild enough to keep the processing temperature of the compound below that in which foaming may be prematurely initiated. The final compound can be strand extruded and pelletized or alternatively an underwater pelletizing technique may be used (in other words air or water cooling is acceptable).

In other aspects, the invention provides a method of manufacturing a foamable composition, which comprises forming a mixture comprising of a blend of a magnesium silicate compound, a foaming agent and at least one base fluoropolymer using thermal and mechanical energy at a processing temperature below a temperature at which foaming of the mixture occurs; where the foaming agent is present in a concentration range of about 0.1 percent to about 10 percent by weight of the mixture and; then processing the mixture to form a foamable composition.

In some embodiments of the above method, the base fluoropolymer can be any of MFA, FEP, PFA, PTFE, ETFE, ECTFE, PVDF, or combinations of any two or more of these fluoropolymers.

In some embodiments, processing the mixture in the above method comprises extruding the mixture to form an extrudate. In some cases, the extrudate can be pelletized to form a plurality of foamable pellets.

In some embodiments, the processing of the mixture in the above method results in one or more foamable pellets having a solid phase such that the foamable pellets are capable of being processed to form a foamed article.

In some embodiments, in the above method, the foamable composition is produced at a temperature low enough to prevent the foamable composition from foaming.

In some embodiments, in the above method, the temperature is sufficiently low so as to thermally constrain the foamable composition from foaming.

In some particular embodiments, in the above method, processing the foamable composition comprises applying energy to the foamable composition. By way of example, the applied energy can be any of heat, pressure, or a combination of heat and pressure.

In some embodiments, in the above method, processing the foamable composition comprises melt processing.

In some particular embodiments, in the above method, the foamable compositions can be in a solid state or a molten state.

In some embodiments, in the above method, the foaming agent is present in a concentration range of about 0.1 percent to about 5 percent by weight of the mixture. For example, the foaming agent can be present in a concentration range of about 0.1 percent to about 2 percent by weight of the mixture. In some cases, the foaming agent can be magnesium carbonate, calcium carbonate, or a mixture of both magnesium carbonate and calcium carbonate.

In some embodiments, in the above method, at least one magnesium silicate compound comprises at least one hydrated magnesium silicate compound. For example, at least one magnesium silicate compound can include talc or any talc derivative. In some cases, in the above method, the magnesium silicate compound is present in a concentration range of about 2 percent to about 50 percent by weight of the foamable composition. In some cases, the magnesium silicate compound is present in a concentration range up to about 20 percent by weight of the foamable composition, e.g., in a concentration range of about 0.2 percent to about 20 percent, or in a concentration range of about 0.5 percent to about 20 percent, in a concentration range of about 2 percent to about 20 percent, or a in a concentration range of about 15 percent to about 20 percent. In some cases, the magnesium silicate compound is present in a concentration range equal to or greater than about 30 percent by weight of the foamable composition, e.g., in a concentration range of about 30 percent to about 50 percent by weight of the foamable composition.

In one embodiment, the magnesium silicate compound comprises about 7.5 percent by weight of the foamable composition. In another embodiment, the magnesium silicate compound comprises about 6 percent by weight of the foamable composition.

In many embodiments, the magnesium silicate compound is capable of functioning as both a nucleating agent and a foaming agent of the foamable composition and can allow for processing the composition at a temperature up to about 30 degrees F. below conventional temperatures normally required during extrusion of conventional foamable compositions having the same base fluoropolymer. Such conventional temperatures can be slightly below or above the melting point of the fluoropolymer. The magnesium silicate compound can also act as a processing aid to reduce or eliminate melt fracture during processing of the fluoropolymer.

In some cases, a method for making a foamable composition can be combined with an additional fluoropolymer and the combination can be processed to form a foamed article.

In one embodiment, a method for manufacturing a foamed article comprises providing a foamable composition including at least one fluoropolymer, at least one magnesium silicate compound and, a foaming agent, where the foaming agent is present in a concentration range of about 0.1 percent to about 10 percent by weight of the foamable composition and, processing the foamable composition to form a foamed article.

By way of example, the foamed article comprises, without limitation, communications cables, conductor separators, cable support-separators, wire insulation, jacketing, wraps, tapes, conduit tubes, or any combination of the communications cables, conductor separators, cable support-separators, wire insulation.

In many embodiments, the above processing step comprises applying energy, such as heat, pressure or a combination of heat and pressure, to the foamable composition. By way of example, the processing step can include melt processing the foamable composition.

In some cases, the foaming agent can be present in a concentration range of about 0.1 percent to about 5 percent by weight of the foamable composition. For example, the foaming agent can be present in a concentration range of about 0.1 percent to about 2 percent by weight of the foamable composition. In some cases, the foaming agent can be magnesium carbonate, calcium carbonate or a mixture of magnesium carbonate and calcium carbonate. In some cases, a mixture of magnesium carbonate and calcium carbonate is employed in which the magnesium carbonate comprises about 0.3 percent to about 3 percent by weight of the foamable composition and the calcium carbonate comprises about 0.1 percent to about 1 percent by weight of the foamable composition.

In some cases, the magnesium silicate compound comprises at least one hydrated magnesium silicate compound. For example, the magnesium silicate compound can be talc or any talc derivative. In some embodiments, the magnesium silicate compound can comprise about 6.0 percent by weight of the foamable composition. In some cases, at least one magnesium silicate compound comprises about 6 percent by weight of the foamable composition and the foaming agent comprises about 0.4 percent by weight of the composition. In some cases, at least one magnesium silicate compound comprises about 6 percent by weight of the foamable composition and the foaming agent comprises magnesium carbonate at about 1 percent by weight of the foamable composition.

In some cases, in the above method, the foamable composition is in the form of one or more pellets.

In some cases, in the above method, one or more fluoropolymers are added to the foamable composition. By way of example, the additional one or more fluoropolymers can be present at a concentration of about 7.5 percent by weight of the foamable composition.

In other embodiments, the invention provides a method and system for heating the talc powder and a selected pelletized perfluoropolymer or fluoropolymer creating a melt blendable composition, extruding the molten composition, cooling the molten composition and forming the solid composition into a pelletized nucleating and foaming agent.

Another embodiment includes communications cables, conductor separators, conductor/cable support-separators, jacketing, tapes, wraps, wire insulations, conduit tubes, or any combination of the communications cables, conductor separators, cable support-separators, and wire insulation, individually comprising the same blown or foamed composition or may utilize the composition that includes selected perfluoropolymers or fluoropolymers.

Another embodiment of the disclosure includes the use of a foamed core and/or the use of a hollow center of the core, which in both cases significantly reduces the material required along the length of the finished cable. The effect of foaming and/or producing a support-separator with a hollow center portion should result in improved flammability of the overall cable by reducing the amount of material available as fuel for the UL 910 test, improved electrical properties for the individual non-optical conductors, and reduction of weight of the overall cable.

A method and system wherein the blown and/or foamed perfluoropolymer composition, cable, support-separator, conduit tube, insulation, jacketing, wrapping and/or taping line speeds are at or about 75 to 1500 ft/min.

Additional benefits of the embodiments include reduction of the overall material mass required for conventional spacers, insulation and jacketing which contributes to flame and smoke reduction.

Another embodiment of the disclosure includes using this foam process, with either chemical or gas foaming, and placing the foam skin with both being the same materials (e.g., Perfluoropolymers) in a coextrusion or a second extrusion of a thermoplastic non-fluoropolymer as a skin or encapsulated by a layer of foam or solid perfluoropolymer skin as an insulation, cable filler or jacket.

In an embodiment of the present disclosure, it has been found that talc, generally known as a nucleating agent in foamed plastics, exhibits blowing agent properties without the presence of a blowing agent.

Another embodiment combines talc, as a blowing agent, with resin(s) in the absence of any additional chemical blowing agent wherein the talc comprises about 2-50 percent by weight of the resin and wherein the resulting composition is extruded into an extrudate product.

In another embodiment the talc is combined with a resin as a masterbatch in a percentage of up to 15 percent talc by weight to resin and extruded as a pellet.

In another embodiment the talc is combined with a recycled resin as a masterbatch in a percentage of up to 20 percent talc by weight to recycled resin and extruded as a pellet.

In another embodiment the resin(s) may be perfluoropolymers as a subset of fluoropolymers FEP, MFA, PFA perfluoropolymers or semicrystalline fluoropolymers ECTFE, ETFE, PVDF, and PTFE, etc as pure resin, recycled resin, as a single resin or in combination with other resins.

In yet another embodiment the extrudate is a pellet, cross web, insulation, jacketing, and wire insulation.

In another embodiment the compounding pellet that is processed as an extrudate at a sufficiently low temperature so that the fluoropolymer resin(s) are thermally constrained from foaming so as to form an extrudate that can subsequently be extruded into jackets, separators, insulation, etc.

In another embodiment the pellets are extruded at a sufficiently high temperature so that the resin is receptive to the talc blowing agent so as to generate a foamed article.

In another embodiment the pellets may optionally include a color concentrate.

In yet another embodiment the foamable fluoropolymer compositions include fluoropolymer and perfluoropolymer materials wherein the recycled percentage used is between about 1 and 100 percent.

Additionally the foamable fluoropolymer compositions are also comprised of organic or inorganic salt(s) and selected one or more perfluoropolymers.

In one embodiment talc and perfluoropolymers or one or more fluoropolymers are recycled or virgin and are extruded and formed into pellets.

Additionally, the foamable fluoropolymer compositions providing cellular insulation are 100 percent recyclable.

In another embodiment, foamable fluoropolymer compositions further include at least one of inorganic and/or organic salt(s), metallic oxides, including zinc oxides, silica, silica oxides, substituted and/or unsubstituted fullerenes PTFE fibrils, ETFE fibrils, metallic borates, flame retardant fibers including PAN fibers and small particles, and organoclays based on montmorrilonite such as Perkolite® thereby reducing flame spread, smoke and improving char integrity when the composition is combusted.

In an additional embodiment, a method for manufacturing foamable perfluoropolymer cellular insulation compositions, includes providing a mixture of a first composition that comprises up to about 20 weight percent of a blowing or foaming agent and a second composition that comprises up to 80 weight percent of one or more selected perfluoropolymers, heating the blend to cause melting of the first and second compositions to form a molten blend of the compositions, extruding and cooling the molten blend to form a plurality of foamable pellets.

The foamable pellets can be used to generate one or more foamed articles is required.

In a further embodiment the step of using pellets to generate the one or more foamed articles comprises also using a chemical or a gas injection method.

In another embodiment manufacturing foamable fluoropolymer compositions includes the incorporation of second composition which includes at least one of organic or inorganic salt(s).

In another embodiment a mixture is provided that includes tumble blending a pellet formed with fluoropolymer(s), magnesium carbonate, calcium carbonate, or both magnesium carbonate and calcium carbonate together with another pellet containing fluoropolymers and talc and a blend of magnesium carbonate, calcium carbonate and Aclyn wax to form a resultant foamable pellet having improved properties for fabricating foamed articles.

Additionally, adding a color concentrate to the mixture described above or to any of the compositions described here within to incorporate color concentrate within the pellets is desirable.

A further embodiment includes utilizing pellets for manufacturing a first insulative covering surrounding conductive core(s) such that the insulative covering is foamed and is subsequently covered with a second insulative layer which is either solid or foamed.

Another embodiment includes a process, which comprises extruding a composition capable of forming a cellular foamed article in an extruder wherein the extruder is specially designed to minimize mechanical shear and increase heating thereby mitigating premature foaming during the process of melting, blending, extruding, and pelletizing said composition as well as mitigating corrosion of the extruder barrel due to passivation of acid and acidic gases evolving from the use of pellets together with the perfluoropolymers and fluoropolymers during the extrusion process.

Another embodiment includes a method of forming fluoropolymer compositions comprising of adding into an extruded melt of a base fluoropolymer resin, in sequential steps, sufficient talc to accomplish a loading of talc in a range of about 0.5 to 20 percent in combination with fluoropolymer resin to form a foamable composition, wherein the foamable compositions are used for subsequent extrusion or molding processes providing cellular, foamed, or blown fluoropolymer end products.

Another embodiment includes compositions that are extruded or molded into desired shapes and geometries without requiring the use of pellets and wherein talc acts as a chemical blowing agent and may also act as a nucleating agent, a foaming agent or both a nucleating and foaming agent during extrusion or molding or any thermal processing.

Another embodiment includes a method where compositions are extruded or molded into desired shapes and geometries requiring pellets and wherein talc acts as a chemical blowing agent and may also act as a nucleating agent, a foaming agent or both a nucleating and foaming agent during extrusion molding or any thermal processing.

Still yet another embodiment includes using talc for neutralizing the acidity of hydrogen fluoride present in the extruded melt and for lubricating and mitigating corrosion in extrusion barrels, screws, extrusion heads, tools and dies used to generate the extruded melt.

Another embodiment includes the use of talc to significantly reduce the acidity of hydrogen fluoride generated during extrusion of fluoropolymer compositions.

In another embodiment, a foamable composition is described that is suitable for forming a foamed cellular insulation article that reduces the quantity of combustible materials by 30 to 60 percent based on the extent of the foaming process and wherein the cellular foamed insulation article is achieved with or without a gas blowing agent.

In yet a further embodiment, the gas blowing agent is used in combination with said talc resulting in an increase in the percentage of cellular structure within said cellular foamed insulation article.

In an additional embodiment, making a communications cable having flame retardant properties comprises the steps of; providing melt processable pellet(s) comprising fluoropolymer(s), talc, and magnesium carbonate, calcium carbonate, or both magnesium carbonate and calcium carbonate capable of forming foamed articles; melt processing pellet(s) at a predetermined temperature exceeding about 525 degrees F. to ensure reaching the required temperature for foaming said pellets prior to entering an extruder, extruding a metered amount of melted pellets around an advancing electrical conductor and allowing the composition to foam and expand to produce an insulated conductor with a chemically blown fluoropolymer insulation.

In another embodiment the pellets comprise perfluoropolymers and/or fluoropolymers and a blowing agent consisting essentially of talc or any talc derivative, wherein the talc or any talc derivative is a natural or synthetic hydrated magnesium silicate.

In a further embodiment the talc or any talc derivative is a chemical composition comprising magnesium hydrosilicate represented by the formula; $3MgOSiO_2H_2O$, wherein $SiO_2$ is about 63.5 weight percent MgO is about 31.90 weight percent and $H_2O$ is about 4.75 weight percent and can also include other minerals comprising; magnesite, chlorite, calcite, magnetite, carbonate, and dolomite.

Further to the embodiment above, the foamable compositions include one or more of FEP, PFA MFA, PVDF, ECTFE, ETFE, and PTFE, and any or all of the following additives including inorganic and/or organic salt(s), metallic oxides, including zinc oxides, silica, silica oxides, substituted and/or unsubstituted fullerenes, PTFE fibrils, ETFE fibrils, metallic borates, flame retardant fibers including PAN fibers and particles of PAN, and organoclays primarily composed as montmorilonite also known as Perkolite®, the resulting foamed extrudate, thereby reducing flame spread, smoke, and improving char integrity when the compositions are combusted.

Another object of the disclosure is a foamed insulation comprising said composition.

Still an object of the invention is a process for manufacturing the composition.

Still another object of the disclosure is a process for manufacturing foamed insulation from the composition.

Other objects of the disclosure include recycled or waste materials to form these compositions (pelletized or otherwise), which can be processed and tumble blended with or without virgin or bare perfluoropolymer or fluoropolymers to obtain acceptable foamable compositions after heating and extrusion.

Foamed or blown articles or foamed composition produced with a gas blowing agent can be used in combination with talc leading to an increase in the percentage of cellular structure within a foamed or foamable composition when the combination of talc and either a chemical or gas blowing agent is used. This works with the use of pellets that incorporate talc and where these pellets have been formed when talc and fluorinated polymers form pelletized extrudate. The pelletized extrudate (pellets) are then subsequently heated via extrusion, molding, etc., to form the foamed, blown or cellular articles of matter. These pellets are known as "foamable" pellets or foamable fluoropolymer compositions that may incorporate perfluoropolymers.

Additionally the pellets are suitable for foaming or blowing such that when the pellets are combined with additional one or more selected perfluoropolymers or selected fluoropolymer in an amount of about 7 weight percent to about 70 weight percent of the pellets to form an extrudate that is a foamed cellular insulation article.

Another embodiment is a method for manufacturing foamed or blown perfluoropolymer cellular insulation compositions wherein a second composition is a blowing or foaming agent comprising 20 weight percent of the first composition and 80 weight percent of the selected one or more perfluoropolymers heated to an appropriate melting point with homogeneously blending, extruding, cooling and forming into pellets using chemical or gas injection methods.

Another embodiment is an extrusion process wherein extrusion of a composition capable of forming cellular foam is extruded in an extruder wherein the extruder is specifically designed to minimize mechanical shear and excessive heating, thereby mitigating premature foaming during the process of melting, blending, extruding and pelletizing said composition as well as mitigating corrosion of the extruder barrel due to passivation of acid and acidic gases provided by the use of talc with the perfluoropolymers and fluoropolymers during the extrusion process.

In an additional embodiment a perfluoropolymer compositions comprising an extruded melt of a base perfluoropolymer resin into which sufficient talc has been added, in sequential steps, to accomplish a loading of talc in a range of 0.5 to 20 percent in combination with the perfluoropolymer resin so as to form compound pellets, wherein the compositions may be used for subsequent heat extrusion or molding processes and provide cellular or foamed or blown fluoropolymer or perfluoropolymer end products. In another embodiment the compounded pellets comprise about 7.5 weight percent talc and about 92.5 weight percent perfluoropolymer resin.

The perfluoropolymer compositions may be extruded or molded into desired shapes and geometries without pelletizing, wherein the talc is acting as a chemical blowing agent and may also act as a nucleating agent, a foaming agent or both during extrusion or molding.

The foamable compositions of the invention can be used to form foamed cellular insulation articles characterized by a reduction in combustible materials by 30 to 60 percent based on the extent of the foaming process, wherein such a foamed cellular insulation article is achieved with or without a chemical blowing agent or gas blowing agent.

Another embodiment is a method of making a communications cable having flame retardant properties comprising the steps of; mixing one or more pellet(s) formed in accordance with the teaching of the invention at a temperature of at most 600 degrees F. to ensure reaching the melting point of the fluoropolymer and melt processing the cable compositions at predetermined temperatures exceeding 525 degrees F. to ensure reaching the required temperature of the blowing agent, extruding a metered amount of a melted composition around an advancing electrical conductor and allowing the composition to foam and expand to produce an insulated conductor with a chemically blown perfluoropolymer insulation.

The pellets can comprise about 7.5 weight percent of said talc and about 92.5 weight percent of the perfluoropolymer or fluoropolymer.

The pellets can comprise from about 2 to about 30 weight percent of said talc and about 70 to about 98 weight percent of the perfluoropolymer or fluoropolymer.

As noted above, the talc or talc derivative is a chemical composition of a magnesium hydrosilicate represented by the formula; $3MgOSiO_2H_2O$, wherein $SiO_2$ is 63.5 percent weight, MgO is 31.90 percent weight and $H_2O$ is 4.75 percent weight and optionally includes other minerals including magnesite, chlorite, calcite, magnetite, carbonate, and dolomite.

The pellets can be chemically foamed or blown via an extrusion process, a molding process or any known process employing heat and/or pressure to achieve a commercially viable cellular product(s).

The cellular product(s) include, without limitation, FEP, PFA and MFA, PTFE, ETFE, ECTFE or PVDF the resulting foamed extrudate of which comply with fire and smoke and sheathing requirements for LAN cable.

Cellular material can be formed by heating pellets having a perfluoropolymer and a blowing agent consisting primarily of talc, to a temperature above the melting temperature of the perfluoropolymer, and above the required temperature of the talc.

The cellular material is formed by heating the pellets during an extrusion process.

Using 7.5% talc within the starting resin to produce a pellet could also include the use of molybdates including calcium and ammonium octa molybdate which can be either dry blended with the pellets or incorporated into the pellets with the pre-formulated 7.5% talc containing pellets for completing either a 2-step or 1-step thermal processing procedure is also an object of the present disclosure. In addition or separately, MgOH and $MgCO_3$ can also be used in combination with these 1 or 2 step thermal processing procedures to improve the final thermal properties of any desired product.

BRIEF DESCRIPTION OF THE DRAWINGS

The invention will be more fully understood from the following detailed description taken in conjunction with the accompanying drawings, in which:

FIG. 1 is a sectional view of an article having two insulative layers surrounding a conductive core.

DETAILED DESCRIPTION OF THE INVENTION

For the purpose of the present invention, the term "fluoropolymer" is intended to denote any polymer comprising recurring units (R), with more than 25 weight percent of recurring units (R) being derived from at least one ethylenically unsaturated monomer comprising at least one fluorine atom (hereinafter, fluorinated monomer).

The fluoropolymer comprises preferably more than 30 weight percent, more preferably more than 40 weight percent of recurring units derived from the fluorinated monomer.

The fluorinated monomer can further comprise one or more other halogen atoms (Cl, Br, I). When the fluorinated monomer is free of a hydrogen atom, it is designated as per(halo)fluoromonomer. When the fluorinated monomer comprises at least one hydrogen atom, it is designated as hydrogen-containing fluorinated monomer.

Non limitative examples of fluorinated monomers are notably tetrafluoroethylene (TFE), vinylidene fluoride (VdF), chlorotrifluoroethylene (CTFE), and mixtures thereof.

Optionally, the fluoropolymer may comprise recurring units formed from one first monomer, said monomer being a fluorinated monomer as above described, and at least one other monomer [comonomer (CM), hereinafter].

Hereinafter, the term comonomer (CM) should be intended to encompass both one comonomer and two or more comonomers.

The comonomer (CM) can notably be either hydrogenated (i.e. free of fluorine atom) [comonomer (HCM), hereinafter] or fluorinated (i.e. containing at least one fluorine atom) [comonomer (FCM), hereinafter].

Examples of suitable hydrogenated comonomers (HCM) are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

The polymer can be a hydrogen-containing fluoropolymer. By "hydrogen-containing fluoropolymer" it is meant a fluoropolymer as above defined comprising recurring units derived from at least one hydrogen-containing monomer. A hydrogen-containing monomer may be the same monomer as the fluorinated monomer or can be a different monomer.

Thus, this definition encompasses notably copolymers of one or more per(halo)fluoromonomers (for instance tetrafluoroethylene, chlorotrifluoroethylene, hexafluoropropylene, perfluoroalkylvinylethers, etc.) with one or more hydrogenated comonomer(s) (for instance ethylene, propylene, vinylethers, acrylic monomers, etc.), and/or homopolymers of hydrogen-containing fluorinated monomers (for instance vinylidene fluoride, trifluoroethylene, vinyl fluoride, etc.) and their copolymers with fluorinated and/or hydrogenated comonomers.

The hydrogen-containing fluoropolymers are preferably chosen among:

TFE and/or CTFE copolymers with ethylene, propylene or isobutylene (preferably ethylene), with a molar ratio per(halo)fluoromonomer(s)/hydrogenated comonomer(s) of from 30:70 to 70:30, optionally containing one or more comonomers in amounts of from 0.1 to 30 percent by moles, based on the total amount of TFE and/or CTFE and hydrogenated comonomer(s) (see for instance U.S. Pat. No. 3,624,250 and U.S. Pat. No. 4,513,129);

Vinylidene fluoride (VdF) polymers, optionally comprising reduced amounts, generally comprised between 0.1 and 15 percent by moles, of one or more fluorinated comonomer(s) (see for instance U.S. Pat. No. 4,524,194 and U.S. Pat. No. 4,739,024), and optionally further comprising one or more hydrogenated comonomer(s); and mixtures thereof.

As used here, a blowing agent comprising "primarily talc" achieves at least most of its blowing function from talc. In certain exemplary embodiments wherein the blowing agent comprises primarily talc, the blowing agent is at least about 30 weight percent talc. That is, in such embodiments talc is at least about 30 weight percent of all materials operative as a blowing agent in the composition in the intended extrusion or other forming operation. In certain exemplary embodiments the blowing agent is at least about 10 weight percent talc. In certain exemplary embodiments the blowing agent is at least about 20 weight percent talc. In certain exemplary embodiments the blowing agent consists essentially of talc. In certain exemplary embodiments talc is used in combination with other blowing agents, including, e.g., boron nitride and/or other known blowing agents as well as any of the derivatives of talc. Magnesium carbonate and calcium carbonate are additional chemical blowing agents that may be used in combination with talc or any of the derivatives of talc.

Results and novel features of the present invention will become more apparent from the following drawings, detailed description of the drawings, and the accompanying claims.

The present invention is directed generally to foamable and foaming compositions as well as methods for their formation. In many embodiments, such foamable and foaming compositions include at least one fluoropolymer, a magnesium silicate compound that can function as both a nucleating and a foaming agent and another foaming agent in a small quantity, e.g., in a range of about 0.1 to about 10 percent by weight of the composition. More particularly, it has been unexpectedly discovered that hydrated magnesium silicate (e.g., talc or a talc derivative) can function not only as a nucleating agent but also a foaming agent. In many embodiments, this allows employing only a small amount of another foaming agent to provide a foamable composition that can be processed, e.g., via extrusion, to form a variety of foamed articles.

In some embodiments, the composition comprises magnesium silicate hydroxide, commonly known as talc and a perfluoropolymer. The ratio of talc is at or about 15 percent with the perfluoropolymer at or about 85 percent by weight, however the talc may range in concentration from 0.2 to 20 percent and up to 50%. The perfluoropolymer component of the composition may be MFA, FEP, PFA, or ETFE as a selected, uniform, pure fluoropolymer or perfluoropolymer or as a mixture of one or more different fluoropolymers or perfluoropolymers or 100 percent recycled and/or blended with non-recycled perfluoropolymers in any ratio from 1 to 99 percent. The composition can then be placed in an extruder specifically designed to minimize heat transfer such that foaming or nucleation is not prematurely initiated and such that the composition may be melted, blended, extruded and pelletized. Additionally, an organic or inorganic salt may be added to the pellet composition.

The composition may also comprise inorganic and/or organic additives, for example, inorganic salts, metallic oxides, silica and silicon oxides as well as substituted and unsubstituted fullerenes.

The composition can be in pellet form, which may then be blended with virgin or recycled fluorinated polymers, perfluoropolymers or fluoropolymers, extruded at a temperature higher than the foaming or nucleation temperature so that foaming and nucleation occur in the fluorinated polymers.

Smoke and flame retardants can be added to a foamable, a foaming compositions of the invention, such as those disclosed above, to provide char integrity. By way of example, a foamable composition can include at least one fluoropolymer, at least one magnesium silicate compound, and a flame and smoke retardant, wherein said foaming agent is present in a concentration range of about 0.1 percent to about 10 percent by weight of the foamable composition.

In some cases the use of smoke and flame retardants combined with foamed or cellular, fluoro, and perfluoropolymers which can reduce dripping and provide char integrity during any of the aforementioned combustion tests. Particularly useful in determining successful compositions with these capabilities is the use of the cone calorimeter as described below. The cone calorimeter is a fire test device used to burn small samples of various materials and gather data on heat release, combustion products, and other parameters associated with combustion. The instrument is based on the principle of oxygen consumption calorimetry. This empirical principle is based on the observation that, generally, the net heat of combustion of any organic material is directly related to the amount of oxygen required for combustion. Approximately 13.1 MJ of heat are released per kilogram of oxygen consumed.

At the core of the instrument is a radiant electrical heater in the shape of a truncated cone (hence the name). This heating element irradiates a flat horizontal sample, 100 mm×100 mm and up to 50 mm thick, placed beneath it, at a preset heating flux of up to 100 kW/m$^2$. The sample is placed on a load cell for continuous monitoring of its mass as it burns. Ignition is provided by an intermittent spark igniter located 13 mm above the sample.

The gas stream containing the combined combustion products is captured through an exhaust duct system, consisting of a high-temperature centrifugal fan, a hood, and an orifice-plate flowmeter. The typical air flow rate is 0.024 m$^3$/sec. Oxygen concentration in the exhaust stream is measured with an oxygen analyzer capable of an accuracy of 50 ppm, and the heat release rate is determined by comparing the oxygen concentration with the value obtained when no sample is burning.

To achieve cellular compositions which will adequately reduce flame and smoke and generate char integrity, a description of the use of the possible additives that can be combined to produce pellets capable of being processed into foamed articles is provided. It is also part of the present disclosure to describe the use of such fillers and/or additives which can be added directly to the dry mix prior to melt processing (not necessarily in preprocessed pellet form);

To begin with, Perkalite® is used as a flame retardant synergist in plastics. Perkalite® is a unique and versatile synthetic organoclay, developed by AkzoNobel. It is an organically modified synthetic clay based on magnesium-aluminum layered double hydroxides (LDH), also referred to as hydrotalcite. Upon compounding in polymers, Perkalite® can be delaminated to nanoscale level, resulting in improved polymer properties such as: thermo-mechanical-, flame retardant-, barrier- and rheological properties.

A unique feature of Perkalite® is its higher temperature stability, compared to other commercially available organoclays based on montmorrilonite. Due to the low addition levels needed, Perkalite® offers cost effective solutions for numerous applications including:

Low Smoke Zero Halogen flame retardant compounds: the amount of mineral flame retardants in wire & cable and construction materials can be reduced, resulting in better mechanical properties better processing and reaching more stringent flame retardant ratings.

Other applications include: car tires, polypropylene storage systems, highly filled polymer compounds (as dispersion aid), and several general polypropylene and rubber goods.

The preparation of Polyolefin Perkalite® based nanocomposites is understood and known, however combining this material with foamable fluoropolymers and/or perfluoropolymers (in pellet form or during melt processing) has not been previously described. The following is representative of the processing conditions needed to prepare such compositions:

Processing Steps and Compounding Equipment:
Cost-effective preparation of Perkalite® nanocomposites can be performed by melt-processing of the matrix polymer, Perkalite® and a compatibilizer. Perkalite® polymer nanocomposites are thus conveniently obtained by well-known extrusion compounding methods.

The preferred compounding method consists of a two step preparation method:
1) making a polyolefin/Perkalite® master batch without compatibilizer, and subsequent:
2) let down with the matrix polymer in the presence of a suitable compatibilizer.

The present disclosure involves substituting fluoropolymers for polyolefins with specific materials of construction and processing conditions as described in the working examples given below.

Working through a master batch is in most cases essential to ensure a good delamination of Perkalite® during the let down step. Single-step extrusion compounding does not ensure the full potential of Perkalite®. The single-step extrusion method can result in a product in which Perkalite® behaves like a conventional micro-filler and thus leading to insufficient property enhancements.

A master batch with 20 wt percent Perkalite® is preferred. Other additives, except the compatibilizer, can be added to the master batch.

In a second step the master batch is let down in the presence of the compatibilizer and the matrix polymer to a concentration typically in the range 0.5-5 wt. percent Perkalite®. As compatibilizer, such as maleic anhydride grafted polyolefins should be used in recommended addition levels of 1-2 wt percent (see section Use of Compatibilizers).

The master batch and final compound are best prepared on a co-rotating twin-screw extruder equipped with compounding screws, loss-in-weight feeders (L1WF), optionally a side-feeder, and a vacuum dome. Extruders with a high length/diameter ratio (UD) (e.g. ≥40) are preferred to ensure enough residence time.

Residence Time:

The residence time in the extruder is believed to be of great importance for the degree of delamination of the modified clay. It is believed that delamination depends on the shear stress applied on the Perkalite® particles and on the kinetics of the penetration of the polymer chains between the platelets. Good results can be obtained with processes with an average residence time of approx. 100 s during master batch preparation and approx. 200 s during compounding of the master batch and the compatibilizer into the polymer.

Location of the Feed:

During master batch production, Perkalite® and polymer should be introduced at the same feed location at the beginning of the extruder. The Perkalite® particles experience the optimal pressure and stress required for melting the polymer in the melt section. This can help to break down the Perkalite® particles into smaller units. The Perkalite® particles will not undergo this stress when they are incorporated into the melt by means of a side feeder. The dispersive stress transmitted to the Perkalite® particles will be less than in the melting zone.

Use of Vacuum Port:

Perkalite® F100 is slightly hygroscopic and contains some free water adsorbed between the LDH platelets. Upon compounding Perkalite® in an extruder, the use of a vacuum port is required to remove moisture and prevent voids formation.

Use of Compatibilizers:

The beneficial effect of maleated polyolefins, like Polybond®, as compatibilizing agent is undisputable. In nanocomposites comprising Perkalite®, these products aid delamination, resulting in better final properties.

| Suggested Compatibilizers | | |
| --- | --- | --- |
| Polymer | Compatibilizer | Type |
| PP | Polybond ® 3200 | MA-g-PP |
| LOPE | Polybond ® 3109 | MA-g-LOPE |
| HOPE | Polybond ® 3009 | MA-g-HOPE |
| EVA | No compatibilizer needed | |

Using fluoropolymers and/or perfluoropolymers in combination with such compatibilizers, is however, not known or described and is yet another subject of the present application.

The compatibilizer should be added during the let down step in the main feed together with the master batch and matrix polymer. For optimal final properties a compatibilizer addition level of 1-2 wt percent on the polymer is recommended.

Screw Design:

For both polyolefin/Perkalite® master batch production and subsequent compounding into the matrix-polymer a compounding screw consisting of a melting section, a mixing/dispersing section and a vacuum venting section will provide positive results. The working examples below describe how to achieve compositions of the present disclosure.

Low Smoke Zero Halogen Flame Retardant Compounds:

Environmental and human health concerns are driving rapid growth of Low Smoke Zero Halogen (LSZH) flame retardant compounds. One of the fastest growing classes of halogen free flame retardants are the mineral flame retardants: ATH (aluminumtrihydrate) and MDH (magnesium hydroxide). ATH and MDH are widely used as flame retardant in e.g. wire & cables and building & construction applications.

Although mineral flame retardants offer a relative cost effective solution for many LSZH applications, it has some drawbacks. The most important one being the high loadings of ATH or MDH needed to achieve the flame retardant rating of a certain product. ATH and MDH are typically added in amounts of 50-70 wt % to the compound. As a consequence the mechanical properties of the polymer compound deteriorate and the processing becomes difficult.

Perkalite® acts as a flame retardant synergist, enabling the reduction of ATH or MDH in a compound or achieving better flame retardant ratings. As a result the mechanical and processing properties of the compound can be improved or new applications come in reach. To illustrate the possibilities some examples for the applications in polyolefins are given below. For polyolefins the preferred Perkalite® grade is Perkalite® FR100. The preferred grade for fluoropolymers and/or perfluoropolymers, however, is described in the working examples provided below.

Because of the high processing temperature of LSZH polypropylene compounds (220-230 degrees C.), typically MDH is used as flame retardant, which has higher temperature stability compared to ATH. For many (non wire & cable) applications, the UL-94') Vo rating is an important rating or a good indication for the ultimate flame retardant properties of the final article. To achieve this rating in polypropylene compounds, typically a loading of 65 wt percent MDH is needed. As consequence of this the material becomes very stiff, brittle and difficult to process.

Perkalite® also works as a char promoting agent. The addition of Perkalite® leads to a kind of in tumescent behavior, resulting in a thicker char layer at the surface of the compound. The thicker char layer provides a better barrier against heat radiation and the evaporation of volatile compounds and thus reduces the burning behavior.

LDPE and EVA are widely used in LSZH cable compounds. The main mineral flame retardant applied in this area is ATH, typically at levels of 60-65 wt percent. The main driver in the Wire & Cable industry is to reduce the levels of ATH in order to improve processing and mechanical properties of the compounds, while maintaining the proper flame retardant rating. For some applications it is desirable to improve the flame retardant rating to make new applications for LSZH cables possible.

The tests give mainly insight in the flame spread on the cables. At laboratory scale, the cone calorimeter is the best available tool to get insight in the final burning behavior of the cable (Heat Release Rate (HRR) and Peak Heat Release Rate (PHRR)). Recently cables have been included in the classification system under the European Construction Products Directive (CPD). In this new directive cables are not only tested on flame spread but also on HRR.

To illustrate the effect of Perkalite® on the Heat Release Rate, several compounds with Perkalite® have been made and tested in the cone calorimeter. Besides the Perkalite® addition level, also the effect of the use of a compatibilizer (maleicanhydride grafted polyethylene, MA-g-PE) has been investigated. MA-g-PE is widely used as compatibilizer for ATH and act in Perkalite® containing compounds as a delamination aid.

The proper method for compounding is of key importance to achieve the maximum flame retardant results, since Perkalite® needs to be delaminated in the polymer. Perkalite® can be processed in conventional equipment like: twin-screw extruders, Buss Kneaders and Internal mixers. The delamination process of Perkalite® is mainly driven by physical-chemical interaction and the polymer needs some time to move between the individual Perkalite® platelets. Therefore the important parameter during compounding is allowing sufficient residence time during mixing.

Perkalite® can be used as flame retardant synergist in Low Smoke Zero Halogen (LSZH) compounds, containing Aluminumtrihydrate (ATH) or Magnesium hydroxide (MDH). As a result the amount of mineral flame retardants can be reduced, resulting in better mechanical and processing properties. Moreover, with Perkalite® more stringent flame retardant ratings might become in reach for applications where ATH or MDH only, cannot meet the specification.

In addition to Perkalite®, several other flame retardant, smoke suppressant additives can be combined to provide fluoropolymer/perfluoropolymer compositions which meet the requirements for the present disclosure. Some of the specific commercially available additives include:

KEMGARD® MZM utilizes Zinc as ZnO and Molybdenum as $MbO_3$:

Typical Physical Properties Include:

| Composition: | zinc Molybdate/magnesium hydroxide complex |
|---|---|
| Appearance: | white powder |
| Specific Gravity | 2.63 |
| Oil Absorption (gI100 g) | 32.3 |
| Median Particle Size (microns) | 1.2 |
| pH | 9.4 |
| Solubility (g/100 ml) | 0.016 |
| Moisture (%) | 0.80 |
| 325 Mesh Residue (%-max) | 0.05 |

Applications include for KEMGARD® MZM can include flame retardancy, smoke suppression and dynamic stability in rigid PVC applications—not perfluoropolymers or fluoropolymers. Key known benefits are:
Highly Efficient and Economical
Promotes Char Formation
Excellent Dynamic Stability in PVC Compound
Helps Meet Common Fire/Smoke Test including ASTM E84, E662, D3843, D2863, UL94, UL910 and NFPA 263
Suggested use levels have been addition levels of 8-15 phr are typical.
KEMGARD® 350 utilizes calcium carbonate (cas 471-34-1), calcium molybdate (cas 7789-82-4):
Typical Physical Properties Include:

| Composition: | calcium molybdate |
|---|---|
| Appearance: | white powder |
| Molybdenum Content | 36% |
| Specific Gravity | 4.12 |
| Oil Absorption (gI100 g) | 17 |
| Median Particle Size (microns) | 4.6 |
| pH | 9.4 |
| Moisture (%) | 0.1 |
| 325 Mesh Residue (%-max) | 0.01 |
| Specific Resistance (ohm) | 9,600 |

KEMGARD® 350 is used for flame retardancy and smoke suppression in wire and cable insulation, components, and jacketing. It also can be used in building materials and other low smoke applications with the following key benefits:
High Purity
Excellent Thermal Stability
Excellent Moisture Resistance
Effective Char Formation
Compatible in both Halogenated and Non-Halogenated Systems
Helps Meet Common Fire/Smoke Test including ASTM E84, E662, 0 3843, 0 2863, UL94, UL910 and NFPA 263.
Addition levels of 3-10 phr are typical.
KEMGARD® 501 utilizes calcium carbonate (cas 471-34-1) and calcium molybdate (cas 7789-82-4):
Typical Physical Properties Include:

| Composition: | calcium molybdate complex |
|---|---|
| Appearance: | white powder |
| Specific Gravity | 2.9 |
| Oil Absorption (gI100 g) | 15.1 |
| Median Particle Size (microns) | 3.7 |
| pH | 8.9 |
| Moisture (%) | 0.15 |
| Solubility (g/100 ml) | 0.001 |
| 325 Mesh Residue (%-max) | 0.01 |
| Specific Resistance (ohm) | 8,600 |

KEMGARD® 501 is used for flame retardancy and smoke suppression in plastic compounds, including wire and cable jacketing, rigid sheet, calendered film, wallpaper, adhesives and epoxy compounds. It is:
Highly Efficient and Economical
Promotes Char Formation
Compatible in both Halogenated and Non-Halogenated Systems
Helps Meet Common Fire/Smoke Test including ASTM E84, E662, 03843, 0 2863, UL94, UL910 and NFPA 263.
Addition levels of 3-25 phr are typical.
KEMGARD® 911C utilizes talc (cas number 14807-96-6), zinc molybdate (cas number 61583-60-6, cas 22914-58-5):
Typical Physical Properties Include:

| Composition: | zinc molybdate/magnesium silicate complex |
|---|---|
| Appearance: | white powder |
| Specific Gravity | 2.8 |
| Oil Absorption (gI100 g) | 40.5 |
| Median Particle Size (microns) | 3.3 |
| pH | 6.5 |
| Moisture (%) | 0.40 |
| Solubility (g/100 ml) | 0.030 |
| 325 Mesh Residue (%-max) | 0.20 |

KEMGARD® 911C is used for flame retardancy and smoke suppression in plastic compounds, including wire and cable jacketing, rigid sheet, calendered film, wallpaper, adhesives and epoxy compounds. Key benefits include:

Highly Efficient and Economical
Promotes Char Formation
Compatible in both Halogenated and Non-Halogenated Systems
Helps Meet Common Fire/Smoke Test including ASTM E84, E662, 0 3843, 02863, UL94, UL910 and NFPA 263.

Addition levels of 3-25 phr are typical.

Additionally, Firebrake® 500 fire retardant is a dehydrated zinc borate with multifunctional applications in a variety of polymers. Since Firebrake® 500 contains no water of hydration, it is stable up to 600 degrees C., and therefore it can be used in polymer systems requiring very high processing temperatures. Firebrake® 500 can be fed to extruders, calendars, or injection molding equipment in the same way as other solid polymer additives Firebrake® 500 can be used as a flame retardant and smoke suppressant in a variety of polymers including polyetherketone, polysulfone, fluoropolymer, polyester and nylon. Firebrake® 500 has a very significant beneficial effect on rate of heat release which is of special interest where this factor is important as in aircraft applications.

The composition is given below:

| Chemical Analysis: | Boric Oxide: 56.20% | Zinc Oxide: 43.80% |
|---|---|---|
| Product name: | Firebrake ® 500 | |
| Grade: | All | |
| Product use: | Flame Retardant | |
| Chemical formula: | 2ZnO 3B2O3 | |
| Chemical name/synonyms: | Inorganic borates | |
| Chemical family: | | |
| CAS registry number: | 1332-07-6 | |

Additional additives include the use of PTFE Fibrils of 1-5 percent by weight

Such as FluoroFR® 150: with a primary particle mean size of 50 microns and a primary particle size of 200 nanometers from Shamrock Technologies Polyflon FA 500C, with a primary particle mean size of 500 microns and a primary particle size of 300 nanometers supplied by Daikin USA Also of possible use are flame retardant fibers including oxidized PolyAcryloNitrile (PAN) fibers: 1% to 5% known as PYROMEX Staple with the following properties. An LOI 50-60, Denier: 2, and a filament with an outside diameter of 15 microns supplied by Toho Tenax America.

PANOX FA C063 SSC Staple with the following properties, an LOI of 50 to 60, Denier; 1.67, Filament outside diameter of 13 microns and supplied by SGL Carbon Corp. or Pyron Staple of an LOI of 40 to 50, denier of 1.67, filament outside diameter of 13 microns with a resistivity of $8 \times 10^8$ ohm-cm supplied by Zoltek Corporation Nanotube CarbonFibers MWCNT with the following weight percent of 0.5% to 1.5% and a resistivity greater than $10^9$ ohm-cm are also included as fillers and additives for the present disclosure.

ETFE (ethylene tetrafluoroethylene) MB9315-00 fibrils with an outside diameter of 10 nanometers and length of 10 microns supplied by Hyperion Catalysis International is also included for use in the compositions of the present application.

Summarizing, the goal of flame retardancy and cell size reduction to promote reduced flame spreads and smoke suppression as well as char integrity is recognized with use of the additives and fillers described above which include nanoclays, molybdate metal and salt complexes (silicates, oxides as well as calcium, magnesium, etc.)

Process modifications to achieve average cell size production of less than 10 microns after pellets or other preferred fluoropolymer compositions are foamed, is also a desirable goal to achieve the smoke, flame and char properties needed and previously described. This includes jacket compound modifications to achieve higher jacket char integrity during the UL910 test.

Polybond® 3200 Product Overview:
Polybond® 3200 is a chemically modified polyolefin.
Chemical Structure:
Composition: Maleic anhydride modified homopolymers polypropylene.
Features:
Chemical coupling agent for glass, mica, talc, wood and natural fiber reinforced polypropylene giving enhanced physical and thermal properties.
Compatibilizer for blends such as polypropylene/polyamide and polypropylene/EVOH to improve processing and mechanical properties.
Physical properties comparable to other Polybond® products can be obtained using lower addition levels.

Typical Physical Properties:

| Appearance | Pellets |
|---|---|
| Melt Flow Rate (190/2.16) | 115 g/10 min. (ASTM D-1238) |
| Density @ 23° C. | 0.91 g/cc (ASTM D-792) |
| Melting Point | 157° C. (DSC) |
| Maleic Anhydride Level | 1.0 weight % |

Properties in 30% Glass-Filled Polypropylene:
Increase in Properties Due to Addition of Polybond® 3200

| PROPERTY | 0.25% PB ® 3200 | 0.5% PB ® 3200 | 1.0% PB ® 3200 | 2% PB ® 3200 |
|---|---|---|---|---|
| Tensile Strength | 17% | 19% | 22% | 27% |
| Flexural Strength | 15% | 20% | 26% | 27% |
| Izod Impact | | | | |
| Unnotched | 42% | 45% | 66% | 75% |
| Notched | 36% | 80% | 104% | 120% |

Generation of above data was via twin-screw extrusion. Polybond® addition level was based on total weight of composite. Glass type was PPG 3242 ⅛".

The disclosure includes and defines manufacture of cables, x-webs, separators of any shape or size, as well as insulation for any conductor type and complete jacketing for cables and entire cable constructions utilizing any of the compositions described above.

In another embodiment, an article 10 is disclosed, shown schematically in FIG. 1, which includes a conductive core 20, e.g., a twisted pair cable or other conductive member such as a single wire, covered, e.g., coated, by a foamed perfluoropolymer layer 30, according to the teachings of the invention. Another (second) insulative layer 40 covers, e.g., coats, the first insulative layer 30. The second layer 40 comprises cellular foam cells, e.g., the foam cells can have diameters in the range of about 0.0005 inches to about 0.003 inches. While in some cases the second layer 40 is formed from a fluoropolymer, e.g., in accordance with the teachings of the invention, in other cases it can be formed of a non-fluoropolymer (such as any of the known thermoplastics including crosslinked polyethylene, polyethylene/polypropylene copolymers, polyvinyl chloride and accompanying fillers as required to stabilize these polymers in the presence of the heat needed to process the fluoropolymers, e.g., by using single and or dual extrusion techniques). In some cases, the foamed compositions can be formed by utilizing a cellular foaming extrusion process using a single or dual head extruder with the cellular foam being formed by chemical means, gas injection means, or both chemical and gas injection means.

The disclosure includes and defines manufacture of cables, x-webs, separators of any shape or size, as well as insulation for any conductor type and complete jacketing for cables and entire cable constructions utilizing the compositions described above.

To further elucidate various aspects of the invention, the following working examples are provided. The examples are provided only for illustrative purposes and are not intended necessarily to present and optimal practice of the invention and/or optimal results that may be obtained by practicing the invention.

WORKING COMPOUNDING EXAMPLE 1

A composition including talc (MgSiOH; $3MgO+4SiO_2+H_2O$; $MgOH+H_2O+SiOH$) or other talc/talc derivatives such as $Mg_3Si_4O_{10}(OH)_2$ was sequentially added into the feeder section with base perfluoropolymer resin in a ratio of 15 percent-20 percent talc and 80 percent-85 percent perfluoropolymer resin. The extrusion of the base resin perfluoropolymer is pelletized into a single pellet. The temperature profile for zones 1 through 6 was as follows: 520, 530, 540, 560, 580 and 600 degrees Fahrenheit. The process temperatures of this single compound pellet with 7.5 percent talc and 92.5 percent perfluoropolymer resin was kept to a minimum to ensure no premature foaming occurs during pellet formation. The pellets were then extruded on a 30 to 1 ratio high temperature extruder with temperature zones of 525, 535, 550, 580, 640 and 660 degrees Fahrenheit for the subsequent extrusion into profiles, insulations and jackets.

WORKING INSULATION EXTRUSION EXAMPLE 2

Foamed perfluoropolymer insulation was extruded over 24 gage wire by using a cross head with a tip and die. The extruder was a high temperature 1½ inch, 30:1 ratio device. The screw design was a 4:1 high compression screw. The line speeds were in a range from 400 ft/min. to 1500 ft/min. The screw rpm were from 12 rpm to 35 rpm with pressure ranging from 1500 psi to 2000 psi. The melt temperature was 678 F. The extruder was loaded with pellets containing 10 percent talc and 90 percent FEP. This resulted in an insulation extrudate that was 41 percent foamed with an average foamed cell size of 0.0007 inches.

WORKING PROFILE EXTRUSION EXAMPLE 3

A cross web cable support-separator was manufactured with a 1½ inch high temperature extruder using the following materials and conditions;
Use of a cross web die with a high compression screw, a line speed of 148 ft./min. at a pressure of 1700 psi with a 48 RPM screw speed and a melt temperature of 649 F. The extruder was loaded with a pellet master batch, the pellet comprising 15 percent talc and 85 percent FEP. The pellet master batch was blended in a 50:50 ratio with 100 percent FEP. Therefore, the final blend ratio was 50 percent master batch pellets and 50 percent FEP. This resulted in a cross web extrudate that was 40 percent foamed with an average foamed cell size of 0.0006 inches.

WORKING PROFILE EXTRUSION EXAMPLE 4

A double helix cable support-separator was manufactured using a 1½ inch extruder with the following materials and conditions:

A web cable support-separator was manufactured using a profile extrusion die with a high compression screw, a line speed of 75 ft./min. at a pressure of 1850 psi with a 40 RPM screw speed and a melt temperature of 646 F. The extruder was loaded with master batch pellets containing 15 percent talc and 85 percent FEP. This master batch was blended with 100 percent FEP. The final blend ratio was 70 percent master batch pellets and 30 percent FEP. This resulted in a web extrudate that was 33 percent foamed with an average foamed cell size of 0.0007 inches.

WORKING INSULATION EXTRUSION EXAMPLE 5

Foamed perfluoropolymer insulation was extruded over 24 gage wire by using a cross head with a tip and die. The extruder was a high temperature 1½ inch, 30:1 ratio device. The screw design was a 4:1 high compression screw. The line speeds were in a range from 300 ft/min. to 900 ft/min. The screw rpm were from 12 rpm to 30 rpm with pressure ranging from 1500 psi to 2000 psi. The melt temperature was 680 F. The extruder was loaded with pellets containing 10 percent talc and 90 percent FEP. This resulted in an insulation extrudate that was 35 percent foamed with an average foamed cell size of 0.0007 inches.

COMPOUNDING WORKING EXAMPLE 1

Materials that Could Be Used for Melt Compounding

| | |
|---|---|
| Talc: 7.4% | |
| PTFE Fibrils (FluoroFR ® 150): 1.5% | 9.9% |
| Foamable FEP NP102 - 57P: 91.1% (7.5% × 98.5% = 7.4% Talc) | |

Process Sequences:
Add 7.4% Talc, 1.5% FluoroFR® 150 and 91.1% Foamable FEP 57P.
The mix should be blended in a stainless steel barrel and fed to a melt compounding unit, which could produce a 25 lb batch in continuous sequence resulting in pellets capable of providing foamable compositions.

COMPOUNDING WORKING EXAMPLE 2

Materials that Could Be Used for Melt Compounding

| | |
|---|---|
| Talc: 5.8% | |
| Perkalite® F100: 19.5% | 28.3% |
| Polybond® 3200: 3% | |
| FEP NP102: 71.7% (7.5% × 77.5% = 5.8% Talc) | |

Process Sequences:
Add 5.8% Talc, 19.5% Perkalite® FR100, 3% Polybond® 3200, and 77.5% FEP NP102.
The mix should be blended in a stainless steel barrel and fed to a melt compounding unit using the lowest temperature profile possible, which could produce a 20 lb batch of finished pellets capable of producing foamed articles.
Repeat Working Example 2, using 20% Perkalite®.

COMPOUNDING WORKING EXAMPLE 3

Materials Used for Compounding

| | |
|---|---|
| Talc: 6.8% | |
| Perkalite® FR100 Concentrate CCG | 16.8% |
| FEPFSRF-2A: 10% | |
| Foamable FEP NP102 - 57P: 83.2% (7.5% × 90% = 6.8% Talc) | |

Process Sequence:
Added 6.8% Talc, 10% Perkalite® FR100 FEP concentrate and 83.2% Foamable FEP 57P.
Blended the mix in a stainless steel barrel and fed to the melt compounder and used the lowest possible temperature profile to produce a 25 lb batch of pellets capable or producing foamed articles.
The process recommendations for each of the first three working examples are as follows (where Z2-Z11 is the temperature zones for the melt compounding equipment);

| | Z2 | Z3 | Z4 | Z5 | Z6 | Z7 | Z8 | Z9 | Z10 | Z11 | head |
|---|---|---|---|---|---|---|---|---|---|---|---|
| Temperature Profile: | 400, | 600, | 600, | 600, | 575, | 575, | 575, | 575, | 575, | 575, | 600 F. |
| Compounder RPM: | 110 | | | | | | | | | | |
| Torque level (Amps): | 17% | | | | | | | | | | |

Melt Index should be within the range of 20 to 30

COMPOUNDING WORKING EXAMPLE 4

Materials Composition for Melt Compounding

| | |
|---|---|
| Talc: 7.2% | |
| Perkalite® F100S: 2% | |
| Polybond® 3200: 1% | 11.2% |
| Aclyn wax: 1% | |
| Foamable FEP NP102 - 57P: 88.8% (7.5% × 96% = 7.2% Talc) | |

Process Sequences:
Add 7.2% Talc, 2% Perkalite® F100S, 1% Polybond® 3200, and 1% Aclyn wax, and 88.8% Foamable FEP 57P.

Blended the mix in a stainless steel barrel and fed to the melt compounder and utilized a vacuum system with the lowest possible temperature profile to provide a 25 lb batch of acceptable pellets capable of provided foamed articles.

COMPOUNDING WORKING EXAMPLE 5

Materials Composition for Melt Compounding

| | |
|---|---|
| Talc: 7.25% | |
| Kemgard® MZM: 3% | 10.5% |
| Aclyn wax: 0.25% | |
| Foamable FEP NP102 - 57P: 89.5% (7.5% × 96.75% = 7.25% Talc) | |

Process Sequences:
Added 7.25% Talc, 3% Kemgard® MZM, 0.25% Aclyn wax, and 96.75% FEP 57P.
Blended the mix in a stainless steel barrel and fed to the melt compounder to produce a 25 lb batch in a continuous sequence of acceptable pellets capable of provided foamed articles.

WORKING EXAMPLE 6

Materials Composition that could be Used for Melt Compounding

| | |
|---|---|
| Talc: 7.25% | |
| Kemgard® 350: 3.0% | 10.5% |
| Aclyn wax: 0.25% | |
| Foamable FEP NP102 - 57P: 96.75% (7.5% × 96.75% = 7.25 Talc) | |

Process Sequences:
Add 7.2% Talc, 3.0% Kemgard® 350, 0.25% Aclyn wax, and 96.75% Foamable FEP 57P.

Blended the mix in a stainless steel barrel and fed to the melt compounder to produce a 25 lb batch in continuous sequence of acceptable pellets capable of provided foamed articles.

WORKING EXAMPLE 7

Materials Composition for Melt Compounding

| | |
|---|---|
| Talc: 7.18% | |
| Kemgard® 350: 1.0% | |
| Firebrake® ZB 500: 3.0% | 11.43% |
| Aclyn wax: 0.25% | |
| Foamable FEP NP102 - 57P: 88.57% (7.5% × 95.75% = 7.18 Talc) | |

Process Sequences:
Add 7.18% Talc, 1.0% Kemgard® 350, 3.0% Firebrake® ZB 500, 0.25% Aclyn wax, and 88.57% Foamable FEP 57P.
Blended mix in a stainless steel barrel and fed to the melt compounder to produce a 25 lb batch in continuous sequence acceptable pellets capable of provided foamed articles.

WORKING EXAMPLE 8

Materials Composition that could be Used for Melt Compounding

| | |
|---|---|
| Talc: 7.14%<br>FluoroFR ® 150: 1.5%<br>Kemgard ® 350: 3.0%<br>Aclyn wax 0.25%<br>Foamable FEP NP102 - 57P: 88.11% (7.5% × 95.25% = 7.14% Talc) | 11.89% |

Process Sequences:
Add 7.14% Talc, 1.5% FluoroFR® 150, 3.0% Kemgard® 350, 0.25% Aclyn wax, and 95.25% Foamable FEP 57P.
The mix should be blended in a stainless steel barrel and fed to the melt compounder which could produce a 25 lb batch in continuous sequence to form acceptable pellets capable of provided foamed articles.

WORKING EXAMPLE 9

Materials Composition for Melt Compounding

| | |
|---|---|
| Talc: 7.16%<br>FluoroFR ® 150: 1.5%<br>Kemgard ® 350: 3.0%<br>Foamable FEP NP102 - 57P: 88.34% (7.5% × 95.5% = 7.16% Talc) | 11.66% |

Process Sequences:
Add 7.16% Talc, 1.5% FluoroFR® 150, 3.0% Kemgard® 350 and 88.34% Foamable FEP 57P.
Blended the mix in a stainless steel barrel and fed to the melt compounder to produce 25 lb batches in a continuous sequence to form acceptable pellets capable of provided foamed articles.
Use of the process conditions (which vary from those of working examples 4-9) recommendations include the following:

| | Z2 | Z3 | Z4 | Z5 | Z6 | Z7 | Z8 | Z9 | Z10 | Z11 | head |
|---|---|---|---|---|---|---|---|---|---|---|---|
| Temperature Profile: | 400, | 600, | 600, | 600, | 575, | 575, | 575, | 575, | 575, | 575, | 600 F. |
| Compounder RPM: | 150 | | | | | | | | | | |
| Torque level (Amps): | 29% | | | | | | | | | | |

Melt Index: 20 to 30

WORKING EXAMPLE 10

Materials Composition Used for Melt Compounding

| | |
|---|---|
| Talc: 7.16<br>FluoroFR ® 150: 1.5%<br>Kemgard ® MZM: 3.0%<br>Foamable FEP NP102 - 57P: 88.34% (7.5% × 95.5% = 7.16% Talc) | 11.66% |

Process Sequences:
Add 7.16% Talc, 1.5% FluoroFR® 150, 3.0% Kemgard® MZM, and 88.34% Foamable FEP 57P.
The mix is blended in a stainless steel barrel and fed to a melt compounder which could produce 25 lb batches in continuous sequence to form acceptable pellets capable of provided foamed articles.

WORKING EXAMPLE 11

Materials Composition that is Used for Melt Compounding

| | |
|---|---|
| Talc: 3.0%<br>FluoroFR ® 150: 2.5%<br>Kemgard ® MZM: 2.5%<br>MgCO$_3$: 0.40%<br>Aclyn wax 0.25%<br>Daikin ETFE: 91.35% | 8.65% |

Process Sequences:
Add 3.0% Talc, 2.5% FluoroFR® 150, 2.5% Kemgard® MZM, 0.40% MgCO$_3$, 0.25% Aclyn wax, and 91.35% Daikin ETFE.
The mix is blended in a stainless steel barrel and fed to the melt compounder which could produce a 25 lb batch in continuous sequence to form acceptable pellets capable of provided foamed articles.

WORKING EXAMPLE 12

Materials Composition Used for Melt Compounding

| | |
|---|---|
| Talc: 4.0%<br>FluoroFR ® 150: 3.0%<br>Kemgard ® 350: 2.0%<br>MgCO$_3$: 0.50%<br>Aclyn wax 0.25%<br>PVDF 11008-003: 90.25% | 9.75% |

Process Sequences:
Add 4.0% Talc, 3.0% FluoroFR® 150, 2.0% Kemgard® 350, 0.50% MgCO$_3$, 0.25% Aclyn wax, and 90.25% PVDF 11008-003.
The mix is blended in a stainless steel barrel and fed to the melt compounder which could produce a 25 lb batch in continuous sequence to form acceptable pellets capable of provided foamed articles.
For Compounding Working Examples 10-12, the following process conditions and temperature extrusion profiles were utilized with ETFE and PVDF as the "base" polymers:

| | Temperatures | |
|---|---|---|
| Zone | ETFE | PVDF |
| 1 | 445 F. | 395 F. |
| 2 | 520 F. | 410 F. |
| 3 | 525 F. | 430 F. |
| 4 | 530 F. | 450 F. |
| Clamp | 530 F. | 450 F. |
| Head | 600 F. | 500 F. |

It will, of course, be appreciated that the system, method, compositions and examples provided and that have been described are given simply by the way of illustration, and the disclosure is not limited to the precise embodiments described herein; various changes and modifications may be effected by one skilled in the art without departing from the scope or spirit of the invention as defined in the inventive claims.

What is claimed is:

1. A foamable composition, comprising:
at least one fluoropolymer;
talc at a concentration in a range of greater than about 0.2 percent to about 3 percent by weight of the foamable composition, and;
a foaming agent comprising magnesium carbonate;
wherein said magnesium carbonate is present in a concentration range of about 0.1 percent to about 2 percent by weight of the foamable composition.

2. The foamable composition of claim 1, wherein said foaming agent further comprises calcium carbonate.

3. The foamable composition of claim 1, wherein said talc comprises about 3 percent by weight of said foamable composition and said magnesium carbonate comprises about 0.2 percent by weight of said foamable composition.

4. The foamable composition of claim 3, wherein said foaming agent comprises a mixture of magnesium carbonate and calcium carbonate.

5. The foamable composition of claim 2, wherein calcium carbonate comprises about 0.1 percent to about 1 percent by weight of said foamable composition.

6. The foamable composition of claim 1, wherein said talc comprises about 2 percent by weight of said foamable composition and said magnesium carbonate comprises about 0.2 percent by weight of said foamable composition.

7. The foamable composition of claim 1, wherein said at least one fluoropolymer comprises a perfluoropolymer.

8. The foamable composition of claim 1, wherein said at least one fluoropolymer comprises FEP.

9. The foamable composition of claim 7, wherein said foamable composition is in the form of one or more pellets.

10. The foamable composition of claim 9, wherein said foamable composition is capable of being processed so as to form a foamed article.

11. The foamable composition of claim 10, wherein said foamed article is capable of meeting specific flammability and smoke generation requirements as defined by UL 910, UL 2424, NFPA 262, 259, 255, and EN 50266-2-x, class B test specifications.

12. The foamable composition of claim 10, wherein said foamed article comprises foamed cells having a closed cell structure.

13. The foamable composition of claim 10, wherein said foamed article comprises foamed cells having an open cell structure.

14. The foamable composition of claim 10, wherein said foamed article is selected from the group consisting of communications cables, conductor separators, cable support-separators, wire insulation, jacketing, wraps, tapes, conduit tubes, or any combination of said communications cables, conductor separators, cable support-separators, wire insulation.

15. The foamable composition of claim 1, wherein said foamable composition is capable of being combined with an additional at least one fluoropolymer and the combination is capable of being processed to form a foamed article.

16. The foamable composition of claim 1, wherein said talc is capable of functioning as both a nucleating agent and a foaming agent of said foamable composition and wherein said talc allows for processing at a temperature of up to 30 degrees F. below conventional temperatures normally required during extrusion of conventional foamable compositions having at least one said fluoropolymer.

17. The foamable composition of claim 16, wherein said conventional temperatures are near or above the melting point of said at least one fluoropolymer and wherein said talc acts as a processing aid to reduce or eliminate melt fracture during processing of said at least one fluoropolymer.

18. The foamable fluoropolymer composition of claim 1, wherein said composition comprises recycled fluoropolymer and perfluoropolymer materials and wherein the recycled percentage used is between 1 and 100 percent.

19. The foamable fluoropolymer composition of claim 7, wherein said composition comprises organic or inorganic salt(s) and said selected one or more perfluoropolymers.

20. The foamable fluoropolymer composition of claim 7, wherein said talc and said perfluoropolymers are recycled or virgin and which are extruded and formed into said pellets.

21. The foamable composition of claim 1, wherein said foamable composition is suitable for forming foamed cellular insulation that is 100 percent recyclable.

22. The foamable fluoropolymer composition of claim 1, wherein said composition further includes zinc oxides, silica, and/or silica oxides thereby reducing flame spread, smoke and improving char integrity when said composition is combusted.

23. The foamable composition of claim 1, wherein said foamable composition is suitable for forming a foamed cellular insulation article that reduces the quantity of combustible materials by 30 to 60 percent based on the extent of the foaming process and wherein said cellular foamed insulation article is achieved with or without a gas blowing agent.

24. The composition of claim 1, wherein said foamable compositions include FEP and zinc oxides, silica, and/or silica oxides.

25. The foamable fluoropolymer composition of claim 1, wherein said composition further comprises metallic oxides.

26. The composition of claim 1, wherein said foamable composition comprise FEP and metallic oxides.

27. A foamable composition, comprising:
at least one fluoropolymer;
talc or any talc derivative at a concentration in a range of greater than about 0.2 percent to about 3 percent by weight of the foamable composition, and;
an additional foaming agent comprising magnesium carbonate;
wherein said magnesium carbonate is present in a concentration range of about 0.1 percent to about 2 percent by weight of the foamable composition.

28. The foamable composition of claim 27, wherein said additional foaming agent further comprises calcium carbonate.

29. The foamable composition of claim 27, wherein said talc or any talc derivative comprises about 3 percent by weight of said foamable composition and said additional foaming agent comprises about 0.2 percent by weight of said foamable composition.

30. The foamable composition of claim 29, wherein said additional foaming agent comprises a mixture of magnesium carbonate and calcium carbonate.

31. The foamable composition of claim 30, wherein said calcium carbonate comprises about 0.1 percent to about 1 percent by weight of said foamable composition.

32. The foamable composition of claim 27, wherein said talc or any talc derivative comprises about 2 percent by weight of said foamable composition and said additional foaming agent comprises magnesium carbonate at about 0.2 percent by weight of said foamable composition.

33. The foamable composition of claim 27, wherein said at least one fluoropolymer comprises a perfluoropolymer.

34. The foamable composition of claim 27, wherein said at least one fluoropolymer comprises FEP.

35. The foamable composition of claim 27, wherein said foamable composition is in the form of one or more pellets.

36. The foamable composition of claim 27, wherein said foamable composition is capable of being processed so as to form a foamed article.

37. The foamable composition of claim 36, wherein said foamed article is capable of meeting specific flammability and smoke generation requirements as defined by UL 910, UL 2424, NFPA 262, 259, 255, and EN 50266-2-x, class B test specifications.

38. The foamable composition of claim 36, wherein said foamed article comprises foamed cells having a closed cell structure.

39. The foamable composition of claim 36, wherein said foamed article comprises foamed cells having an open cell structure.

40. The foamable composition of claim 37, wherein said foamed article comprises communications cables, conductor separators, cable support-separators, wire insulation, jacketing, wraps, tapes, conduit tubes, or any combination of said communications cables, conductor separators, cable support-separators, wire insulation.

41. The foamable composition of claim 27, wherein said foamable composition is capable of being combined with an additional at least one fluoropolymer and said combination is capable of being processed to form a foamed article.

42. The foamable composition of claim 29, wherein talc or any talc derivative is capable of functioning as both a nucleating agent and a foaming agent of said foamable composition and wherein said talc or any talc derivative allows for processing at a temperature of up to 30 degrees F. below conventional temperatures normally required during extrusion of conventional foamable compositions having at least one said fluoropolymer.

43. The foamable composition of claim 42, wherein said conventional temperatures are near or above the melting point of said at least one fluoropolymer and wherein said talc or any talc derivative acts as a processing aid to reduce or eliminate melt fracture during processing of said at least one fluoropolymer.

44. A foaming composition comprising:
    at least one fluoropolymer in a molten state at an elevated temperature;
    a foaming agent comprising talc or a talc derivative and magnesium carbonate dispersed in said molten fluoropolymer,
    wherein said elevated temperature is sufficient to activate said foaming agent, wherein said talc or talc derivative is present at a concentration in a range of greater than about 0.2 percent to about 3 percent by weight of the foaming composition, and wherein said magnesium carbonate is present in a concentration range of about 0.1 percent to about 2 percent by weight of the foaming composition.

45. The foaming composition of claim 44, wherein said at least one fluoropolymer comprises two or more different fluoropolymers.

46. The foaming composition of claim 44, wherein said elevated temperature is greater than about 525 degrees F.

47. The foaming composition of claim 46, wherein said talc or a talc derivative allows for processing at a temperature of up to 30 degrees F. below conventional temperatures normally required during extrusion of conventional foamable compositions having at least one said fluoropolymer.

48. The foaming composition of claim 47, wherein said conventional temperatures are near or above the melting point of said at least one fluoropolymer and wherein said talc or a talc derivative acts as a processing aid to reduce or eliminate melt fracture during processing of said at least one fluoropolymer.

49. The foaming composition of claim 44, wherein said elevated temperature is greater than about 340 degrees F. and for lower melting fluoropolymers is in a range of about 430 degrees F. to about 530 degrees F.

50. The foaming composition of claim 49, wherein said elevated temperature for said lower melting fluoropolymers is in a range of about 490 degrees F. to about 530 degrees F.

51. The foaming composition of claim 44, wherein said elevated temperature is in a range of about 570 degrees F. to about 600 degrees F.

52. The foaming composition of claim 44, wherein said elevated temperature is in a range of about 600 degrees F. to about 660 degrees F.

53. The foaming composition of claim 44, wherein said elevated temperature is in a range of about 630 degrees F. to about 660 degrees F.

54. The foaming composition of claim 44, wherein said elevated temperature is in a range of about 640 degrees F. to about 660 degrees F.

55. The foaming composition of claim 44, wherein said foaming agent further comprises calcium carbonate.

56. The foaming composition of claim 44, wherein said talc or a talc derivative comprises about 3 percent by weight of said foaming composition and said magnesium carbonate comprises about 0.2 percent by weight of said foaming composition.

57. The foaming composition of claim 55, wherein said calcium carbonate comprises about 0.1 percent to about 1 percent by weight of said foaming composition.

58. The foaming composition of claim 44, wherein said talc or a talc derivative comprises about 2 percent by weight of said foaming composition and said foaming agent comprises magnesium carbonate at about 0.2 percent by weight of said foaming composition.

59. The foaming composition of claim 55, wherein each of said and said calcium carbonate are present at a sufficient weight percent of said foaming composition such that said foaming composition is capable of being processed so as to form a foamed article.

60. The foaming composition of claim 44, wherein said at least one fluoropolymer comprises a perfluoropolymer.

61. The foaming composition of claim 44, wherein said at least one fluoropolymer comprises FEP.

62. The foaming composition of claim 44, wherein said foaming composition is capable of being processed so as to form a foamed article.

63. The foaming composition of claim 62, wherein said foamed article is capable of meeting specific flammability and smoke generation requirements as defined by UL 910, UL 2424, NFPA 262, 259, 255, and EN 50266-2-x, class B test specifications.

64. The foaming composition of claim 62, wherein said foamed article comprises foamed cells having a closed cell structure.

65. The foaming composition of claim 62, wherein said foamed article comprises foamed cells having an open cell structure.

66. The foaming composition of claim 62, wherein said foamed article comprises communications cables, conductor separators, cable support-separators, wire insulation, jacketing, wraps, tapes, conduit tubes, or any combination of said communications cables, conductor separators, cable support-separators, wire insulation.

* * * * *